US012681920B2

(12) United States Patent (10) Patent No.: US 12,681,920 B2
Lee et al. (45) Date of Patent: Jul. 14, 2026

(54) ELECTRONIC DEVICE INCLUDED IN BLOCKCHAIN NETWORK AND METHOD FOR OPERATING THE SAME

(71) Applicant: Samsung Electronics Co., Ltd., Suwon-si (KR)

(72) Inventors: Jiwon Lee, Suwon-si (KR); Wonhyuk Kang, Suwon-si (KR); Hyeongseob Kim, Suwon-si (KR); Choonghoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/763,348

(22) Filed: Jul. 3, 2024

(65) Prior Publication Data

US 2025/0013631 A1 Jan. 9, 2025

Related U.S. Application Data

(63) Continuation of application No. PCT/KR2024/009396, filed on Jul. 3, 2024.

(30) Foreign Application Priority Data

Jul. 4, 2023 (KR) ........................ 10-2023-0086569
Feb. 16, 2024 (KR) ........................ 10-2024-0022354

(51) Int. Cl.
*G06F 16/23* (2019.01)
*G06F 16/182* (2019.01)
(Continued)

(52) U.S. Cl.
CPC ........ *G06F 16/2379* (2019.01); *G06F 16/182* (2019.01); *G06F 16/27* (2019.01); *H04L 9/50* (2022.05)

(58) Field of Classification Search
CPC .. G06F 16/2379; G06F 16/2365; G06F 21/64; G06F 16/27; G06F 16/182;
(Continued)

(56) References Cited

U.S. PATENT DOCUMENTS 10,382,205 B1 8/2019 Ko
11,538,001 B2 * 12/2022 Handoko ............. G06Q 20/065
(Continued)

FOREIGN PATENT DOCUMENTS

KR 10-2018-0113140 A 10/2018
KR 10-2020-0019061 A 2/2020
(Continued)

OTHER PUBLICATIONS

International Search Report with Written Opinion and English translation dated Oct. 10, 2024; International Appln. No. PCT/KR2024/009396.
Extended European search report dated May 11, 2026; European Appln. No. 24836334.3—1218 / 4672663 PCT/KR2024009396.

*Primary Examiner* — Marcin R Filipczyk
(74) *Attorney, Agent, or Firm* — Jefferson IP Law, LLP

(57) ABSTRACT

An electronic device is provided. The electronic device includes a communication circuit, memory storing one or more computer programs, and one or more processors communicatively coupled to the communication circuit and the memory. The one or more computer programs include computer-executable instructions that, when executed by the one or more processors, cause the electronic device to transmit a request, through the communication circuit a server configured to relay message transmission between nodes included in a blockchain network, to add a new block to the nodes included in the blockchain network, when the request is not rejected by the server, transmit, through the communication circuit to the server for transmission to the nodes via the server, transaction information to be stored in (Continued)

the new block, generate the new block including the transaction information, receive, through the communication circuit from the server, information about blocks generated by first nodes in an active state among the nodes, based on identifying that a number of blocks identical to the new block among the blocks generated by the first nodes is greater than a designated number, transmit, through the communication circuit to the server, information indicating agreement on adding the new block, and based on the transmitting, to the server, of the information indicating the agreement, add the new block to the memory.

18 Claims, 22 Drawing Sheets

(51) Int. Cl.
  *G06F 16/27*      (2019.01)
  *H04L 9/00*      (2022.01)
(58) Field of Classification Search
  CPC ....... G06F 16/23; G06F 21/602; H04L 63/12;
        H04L 9/3239; H04L 9/0643; H04L
        9/3236; H04L 9/3247; H04L 9/50
  See application file for complete search history.

(56)          References Cited

U.S. PATENT DOCUMENTS

| | | | | |
|---|---|---|---|---|
| 2018/0285412 | A1* | 10/2018 | Zhuang | ................. H04L 9/0637 |
| 2019/0251077 | A1 | 8/2019 | Yang | |
| 2019/0332586 | A1 | 10/2019 | Wang | |
| 2020/0110648 | A1 | 4/2020 | Yang | |
| 2020/0366505 | A1* | 11/2020 | Feng | ..................... H04L 9/3239 |
| 2021/0064763 | A1 | 3/2021 | Sanghvi et al. | |
| 2021/0224759 | A1* | 7/2021 | Zorzano Blasco | .......................... |
| | | | | G06Q 20/0655 |
| 2021/0314141 | A1 | 10/2021 | Liao | |
| 2021/0326352 | A1 | 10/2021 | Manevich et al. | |
| 2021/0368026 | A1 | 11/2021 | Emura | |
| 2022/0014377 | A1* | 1/2022 | Vasudevan | .............. G06F 21/64 |
| 2022/0141018 | A1 | 5/2022 | Davis | |
| 2022/0321364 | A1* | 10/2022 | Sholtis | ................... H04L 9/321 |
| 2022/0383273 | A1 | 12/2022 | Dey et al. | |

FOREIGN PATENT DOCUMENTS

| | | |
|---|---|---|
| KR | 10-2020-0101140 A | 8/2020 |
| KR | 10-2020-0144755 A | 12/2020 |
| WO | 2022/0260501 A1 | 12/2022 |

* cited by examiner

ELECTRONIC DEVICE INCLUDED IN BLOCKCHAIN NETWORK AND METHOD FOR OPERATING THE SAME

CROSS-REFERENCE TO RELATED APPLICATION(S)

This application is a continuation application, claiming priority under § 365 (c), of an International application No. PCT/KR2024/009396, filed on Jul. 3, 2024, which is based on and claims the benefit of a Korean patent application number 10-2023-0086569, filed on Jul. 4, 2023, in the Korean Intellectual Property Office, and of a Korean patent application number 10-2024-0022354, filed on Feb. 16, 2024, in the Korean Intellectual Property Office, the disclosure of each of which is incorporated by reference herein in its entirety.

TECHNICAL FIELD

The disclosure relates to an electronic device included in a blockchain network and a method performed by the electronic device.

BACKGROUND ART

Since blockchain-based bitcoin has been made public, blockchain has applications in various sectors, such as smart contract-based platform services or non-fungible token (NFT), cloud storage services, blockchain computing services, as well as electronic currency (cryptocurrency or virtual currency) systems, e.g., bitcoin.

A blockchain platform allows system participants (nodes) to distribute and store data in their respective blocks, and thus is substantially free from data forgery and falsification (i.e., has a high degree of reliability) and allows the participants to own their distributed information (i.e., has a high degree of transparency), with no need for a separate central server manager.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

In accordance with an aspect of the disclosure, an electronic device is provided. The electronic device includes a communication circuit, memory storing one or more computer programs, and one or more processors communicatively coupled to the communication circuit and the memory. According to an embodiment, the one or more computer programs include computer-executable instructions that, when executed by the one or more processors, cause the electronic device to transmit a request, through the communication circuit to a server configured to relay message transmission between nodes included in a blockchain network, to add a new block to the nodes included in the blockchain network, when the request is not rejected by the server, transmit, through the communication circuit to the server for transmission to the nodes via the server, transaction information to be stored in the new block, generate the new block including the transaction information, receive, through the communication circuit from the server, information about blocks generated by first nodes in an active state among the nodes, based on identifying that a number of blocks identical to the new block among the blocks generated by the first nodes is greater than a designated number, transmit, through the communication circuit to the server, information indicating agreement on adding the new block, and based on the transmitting, to the server, of the information indicating the agreement, add the new block to the memory.

In accordance with another aspect of the disclosure, a method performed by an electronic device is provided. The method includes transmitting a request, through a communication circuit included in the electronic device to a server configured to relay message transmission between nodes included in a blockchain network, to add a new block to the nodes included in the blockchain network, when the request is not rejected by the server, transmitting, through the communication circuit to the server for transmission to the nodes via the server, transaction information to be stored in the new block, generating the new block including the transaction information, receiving, through the communication circuit from the server, information about blocks generated by first nodes in an active state among the nodes, based on identifying that a number of blocks identical to the new block among the blocks generated by the first nodes is greater than a designated number, transmitting, through the communication circuit to the server, information indicating agreement on adding the new block, and based on the transmitting, to the server, of the information indicating the agreement, adding the new block to memory included in the electronic device.

In accordance with another aspect of the disclosure, one or more non-transitory storing one or more computer programs including computer-executable instructions that, when executed by one or more processors of an electronic device, cause the electronic device to perform operations, is provided. The operations include transmitting a request, through a communication circuit included in the electronic device to a server configured to relay message transmission between nodes included in a blockchain network, to add a new block to the nodes included in the blockchain network, when the request is not rejected by the server, transmitting, through the communication circuit to the server for transmission to the nodes via the server, transaction information to be stored in the new block, generating the new block including the transaction information, receiving, through the communication circuit from the server, information about blocks generated by first nodes in an active state among the nodes, based on identifying that a number of blocks identical to the new block among the blocks generated by the first nodes is greater than a designated number, transmitting, through the communication circuit to the server, information indicating agreement on adding the new block, and based on the transmitting, to the server, of the information indicating the agreement, adding the new block to memory included in the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a micropro-cessor unit (MPU), a system on chip (SoC), an IC, or the like.

Figure 1:
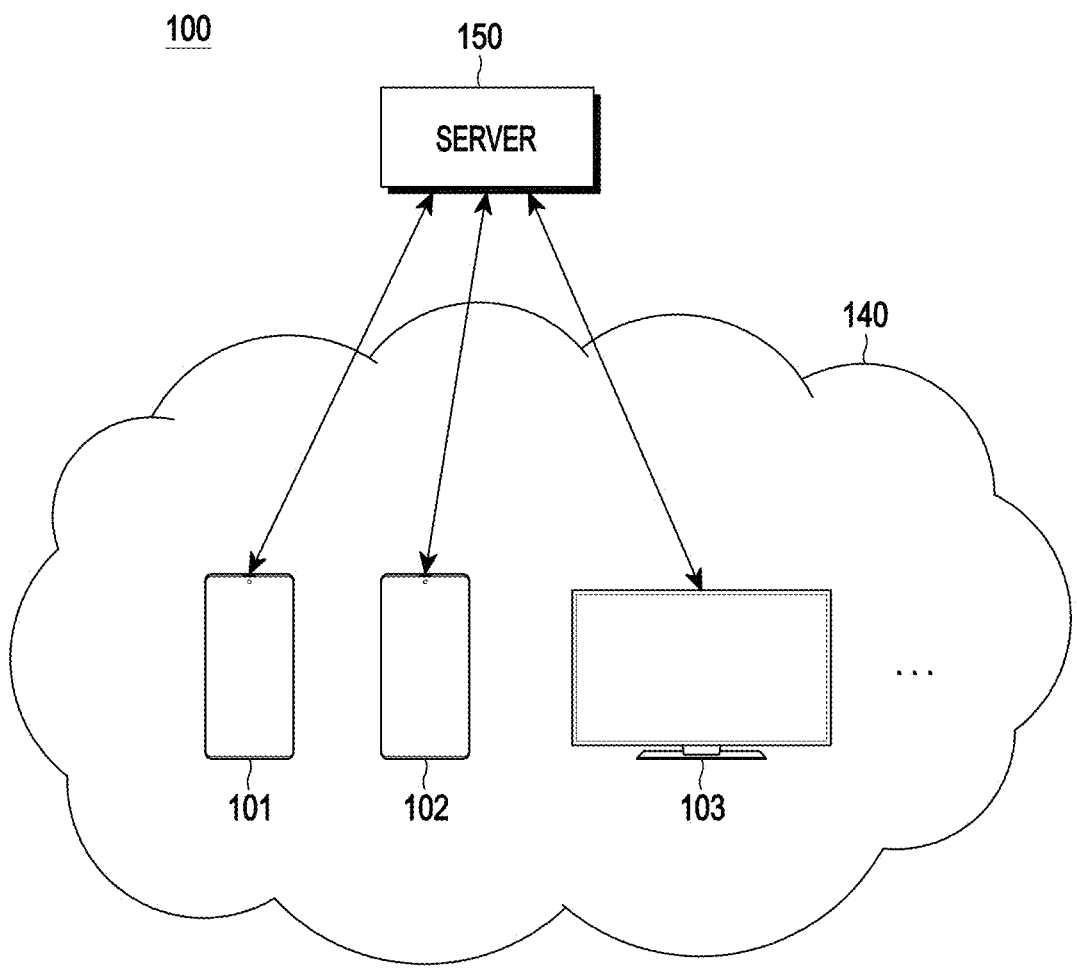
FIG. 1 is a view schematically illustrating an electronic system according to an embodiment.

FIG. 1 is a view schematically illustrating an electronic system according to an embodiment.

Referring to FIG. 1, an electronic system 100 may include a plurality of electronic devices 101, 102, and 103 and a server 150.

According to an embodiment, the plurality of electronic devices 101, 102, and 103 may be implemented as nodes of the blockchain network 140. For example, the plurality of electronic devices 101, 102, and 103 may include various types of electronic devices. Although FIG. 1 illustrates the plurality of electronic devices 101, 102, and 103 as two smartphones and one television (TV), this is merely an example, and the number or type of electronic devices may not be limited thereto.

According to an embodiment, the server 150 may be configured to relay message transmission between nodes (e.g., the plurality of electronic devices 101, 102, and 103) included in the blockchain network 140. For example, nodes 101, 102, and 103 included in the blockchain network 140 may transmit/receive information through the server 150. Although FIG. 1 illustrates the server 150, various types of electronic devices may replace the server 150.

According to an embodiment, the server 150 may store and provide information about the latest blocks of the nodes 101, 102, and 103 included in the blockchain network 140. For example, the information about the latest block may include information about the number of the block last added and stored by each of the nodes 101, 102, and 103. Further, the server 150 may provide information indicating statuses of the nodes 101, 102, and 103 included in the blockchain network 140 (e.g., information indicating whether the corresponding node is currently in an on state or an off state). For example, the on state may indicate a state in which the corresponding node may respond to other nodes. For example, the off state may indicate a state in which the corresponding node may not respond to other nodes. For example, the nodes 101, 102, and 103 included in the blockchain network 140 may access the server 150 to view or identify the information provided by the server 150 described above.

According to an embodiment, the server 150 may manage nodes included in the blockchain network 140. According to an embodiment, the server 150 may support a mutex function for preventing a consensus conflict between the nodes 101, 102, and 103 included in the blockchain network 140. According to an embodiment, the server 150 may determine a consensus condition of the nodes 101, 102, and 103 included in the blockchain network 140. For example, the consensus condition may indicate a condition for consensus for the nodes 101, 102, and 103 to add a new block. For example, depending on implementation, when a predetermined number of nodes among nodes included in the blockchain network 140 respond, the consensus for adding a new block may be met. In this case, the response of the predetermined number of nodes may be a consensus condition. For example, the server 150 may minimize the consensus condition of the nodes 101, 102, and 103 included in the blockchain network 140.

According to an embodiment, the server 150 may include at least one device (e.g., a control device, a storage device, and a management device). Depending on the implementation, the server 150 may be implemented as an aggregate of a plurality of servers.

Configurations and operations of the electronic system 100 described with reference to FIG. 1 are described in more detail with reference to the following drawings. Hereinafter, for convenience of description, electronic devices 101, 102, and 103 corresponding to the nodes included in the blockchain network 140 are described as nodes included in the blockchain network 140. Further, the description assumes that the first electronic device 101 among the electronic devices is a client requesting to add a new block.

Figure 2:
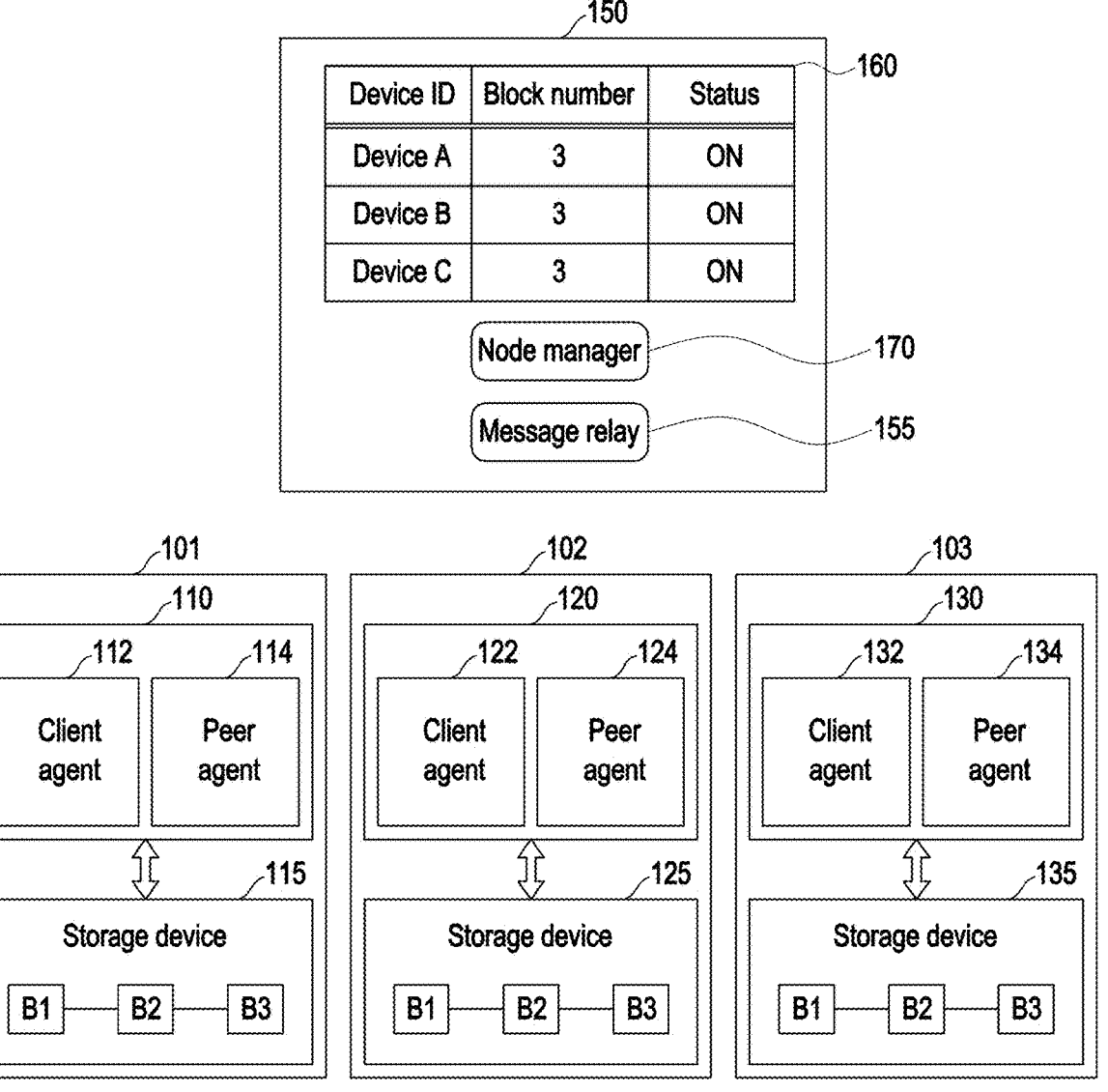
FIG. 2 is a block diagram illustrating nodes and a server included in a blockchain network according to an embodiment.

FIG. 2 is a block diagram illustrating nodes and a server included in a blockchain network according to an embodiment.

Referring to FIG. 2, each of electronic devices 101, 102, and 103 corresponding to nodes included in a blockchain network (e.g., the blockchain network 140 of FIG. 1) according to an embodiment may include a control device 110, 120, or 130. Each of the corresponding electronic devices 101, 102, and 103 may further include a storage device 115, 125, or 135 for storing information about a block. For example, the storage device 115, 125, or 135 may be implemented to be the same as or similar to the memory 1130 of FIG. 11.

According to an embodiment, the control device 110, 120, or 130 may include a processor (e.g., the processor 1120 of FIG. 11) in hardware. According to implementation, the control device 110, 120, or 130 may further include a communication circuit (e.g., the communication module 1190 of FIG. 11) configured to transmit/receive information (e.g., block-related data, transaction information, or signature) to/from the server 150.

According to an embodiment, the control devices 110, 120, and 130 may execute client agents 112, 122, and 132 and peer agents 114, 124, and 134. For example, the client agents 112, 122, and 132 may be modules configured to perform a series of operations related to data of each of the nodes 101, 102, and 103. For example, the peer agents 114, 124, and 134 may be modules configured to control and manage the storage devices 115, 125, and 135. For example, each of the client agents 112, 122, and 132 and the peer agents 114, 124, and 134 may be implemented as a software module or a module in which hardware and software are combined. Depending on implementation, the control devices 110, 120, and 130 may execute only client agents 112, 122, and 132. In this case, the client agents 112, 122, and 132 may also be configured to perform the operations of the peer agents 114, 124, and 134.

According to an embodiment, the client agent 112, 122, or 132 may perform a series of operations related to data of each of the nodes 101, 102, and 103. For example, the client agents 112, 122, and 132 may transmit/receive data or messages to/from the server 150. For example, the client agents 112, 122, and 132 may send a request for adding a new block to the server 150. Further, the client agents 112, 122, and 132 may transmit the transaction information to be included in the new block to the server 150.

According to an embodiment, the peer agents 114, 124, and 134 may control and manage the storage devices 115, 125, and 135. For example, the peer agents 114, 124, and 134 may provide data related to data (e.g., information about blocks) stored in the storage devices 115, 125, and 135. Alternatively, the peer agents 114, 124, and 134 may add and store new blocks in the storage devices 115, 125, and 135.

According to an embodiment, the storage devices 115, 125, and 135 may store a plurality of blocks (e.g., B1, B2, and B3) agreed on by nodes included in the blockchain network 140. Further, the storage devices 115, 125, and 135 may store information (e.g., information related to a signature) related to the blockchain network 140. For example, the latest number of the block last stored in the storage devices 115, 125, and 135 may be "3." For example, the storage devices 115, 125, and 135 may include at least one memory.

The server 150 according to an embodiment may include a message relay 155 and a table 160. The server 150 may further include a control device (not shown) for controlling the overall operation of the server 150.

According to an embodiment, the message relay 155 may relay and transmit a message or information between the nodes 101, 102, and 103 included in the blockchain network 140. For example, the message relay 155 may include a communication circuit supporting wireless communication technology.

According to an embodiment, the message relay 155 may support a mutex function. For example, the mutex function may include a function of providing priority related to an operation of adding the new block to a node that the server 150 requests to first add a new block. For example, when the priority related to the operation of adding the new block is given to a specific node, the server 150 may reject the requests from other nodes while the specific node adds the new block. Depending on the implementation, the server 150 may further support a timer function for the mutex function. For example, the server 150 may limit the time when the corresponding priority is recognized by assigning priority to a specific node and then setting a timer. Alternatively, the server 150 may restrict the specific node from being continuously given priority a designated number of times.

According to an embodiment, the table 160 may display or provide information about the latest block stored in nodes included in the blockchain network 140. For example, the nodes 101, 102, and 103 included in the blockchain network 140 may access the server 150 to view or identify the latest block information of the nodes 101, 102, and 103 recorded in the table 160.

According to an embodiment, the table 160 may include device identification information (e.g., the device identification (ID)), the latest block number, and status information about the node. For example, the table 160 may indicate that the latest block number of the first electronic device 101 (e.g., device A) is "3" and the status is "ON". The table 160 may indicate that the latest block number of the second electronic device 102 (e.g., device B) is "3" and the status is "ON". The table 160 may indicate that the latest block number of the third electronic device 103 (e.g., device C) is "3" and the status is "ON". However, the contents of the above-described table 160 are exemplary, and the technical spirit of the disclosure may not be limited thereto.

According to an embodiment, the server 150 may further include a node manager 170 configured to manage the nodes 101, 102, and 103 included in the blockchain network 140. For example, the node manager 170 may determine the consensus condition (e.g., fault tolerance) of nodes included in the blockchain network 140. For example, the node manager 170 may determine the consensus condition for adding a new block to nodes included in the blockchain network 140. For example, when adding a new block, the node manager 170 may mitigate or adjust the consensus condition so that a new block may be added only by the consensus of a designated number of nodes rather than the consensus of all nodes.

Depending on the implementation, the server 150 may store information about blocks stored in the nodes 101, 102, and 103 included in the blockchain network 140 in a storage device (not shown) connected to the server 150.

FIGS. 3A, 3B, 3C, 3D, 3E, and 3F are views illustrating a method for an electronic device included in a blockchain network to add a new block according to an embodiment.

Figure 3A:
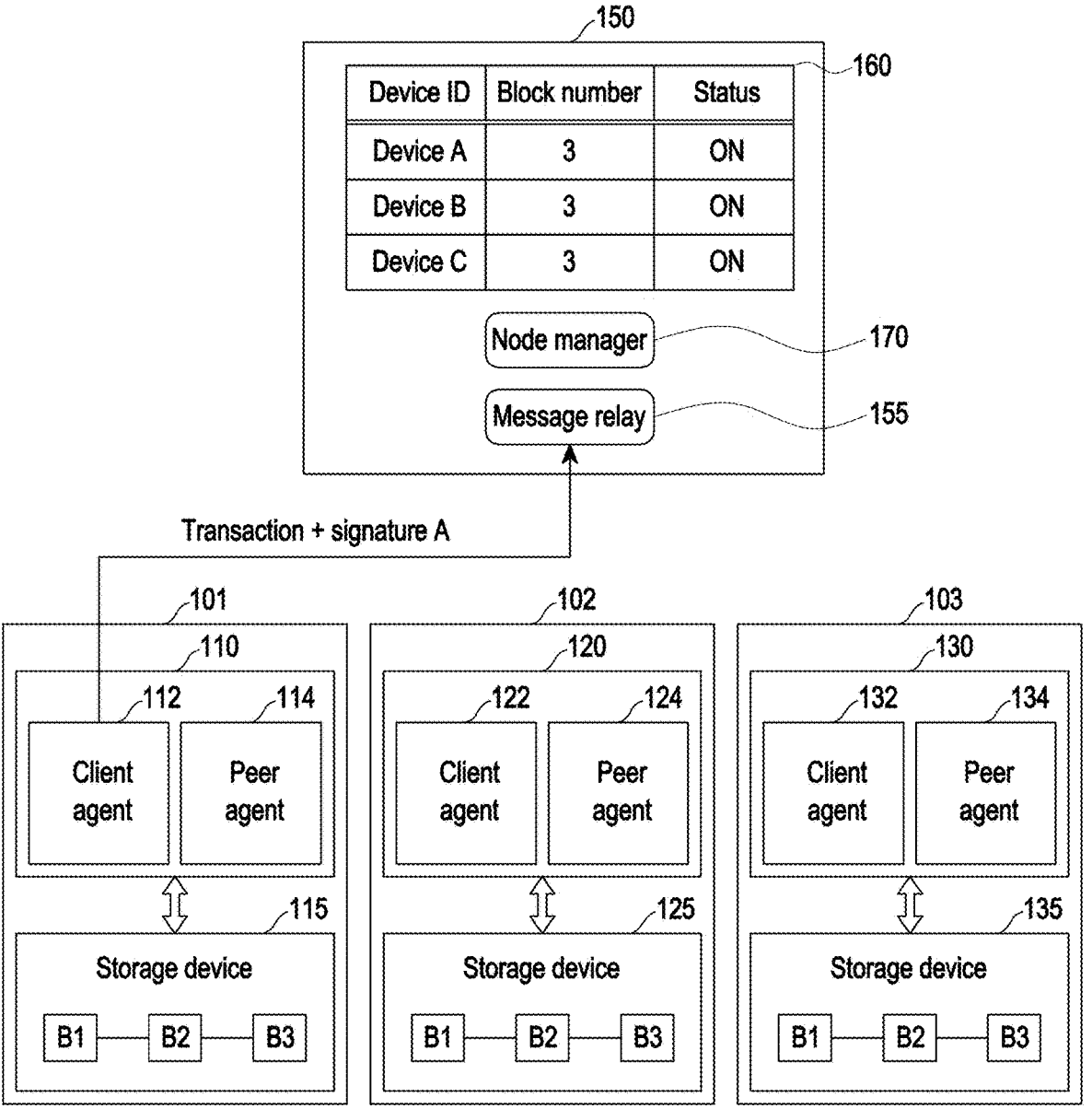
FIGS. 3A, 3B, 3C, 3D, 3E, and 3F are views illustrating a method for an electronic device included in a blockchain network to add a new block according to an embodiment.

Referring to FIG. 3A, according to an embodiment, the first electronic device 101 may access the server 150 (e.g., the server 150 of FIG. 1) to identify the statuses of nodes included in a blockchain network (e.g., the blockchain network 140 of FIG. 1) and information about a block last stored by the nodes.

According to an embodiment, the first electronic device 101 may request the server 150 (e.g., the message relay 155) to add a new block to the nodes 101, 102, and 103 included in the blockchain network 140 through the client agent 112. For example, the server 150 may provide a mutex function. For example, the mutex function may include the function of providing priority related to an operation of adding the new block to the node that has first requested. For example, the server 150 may provide priority related to an operation for the same to a specific node that has first requested to add a new block among the nodes 101, 102, and 103 through the mutex function. For example, after providing priority to the specific node, the server 150 may reject the requests (e.g., the request for adding the new block) of other nodes among the nodes 101, 102, and 103. Depending on the implementation, the server 150 may provide a notification (e.g., a notification indicating request rejection) to the other nodes for which the requests have been rejected.

According to an embodiment, when the request for adding the new block is not rejected from the server 150, the first electronic device 101 may transmit transaction information to be stored in the new block and first signature information (signature A) about the first electronic device 101 to the server 150 through the client agent 112 so that the server 150 transmits the transaction information and the first signature information to the other nodes 102 and 103 included in the blockchain network 140. For example, the first signature information (signature A) may include unique information for identifying the first electronic device 101.

Figure 3B:
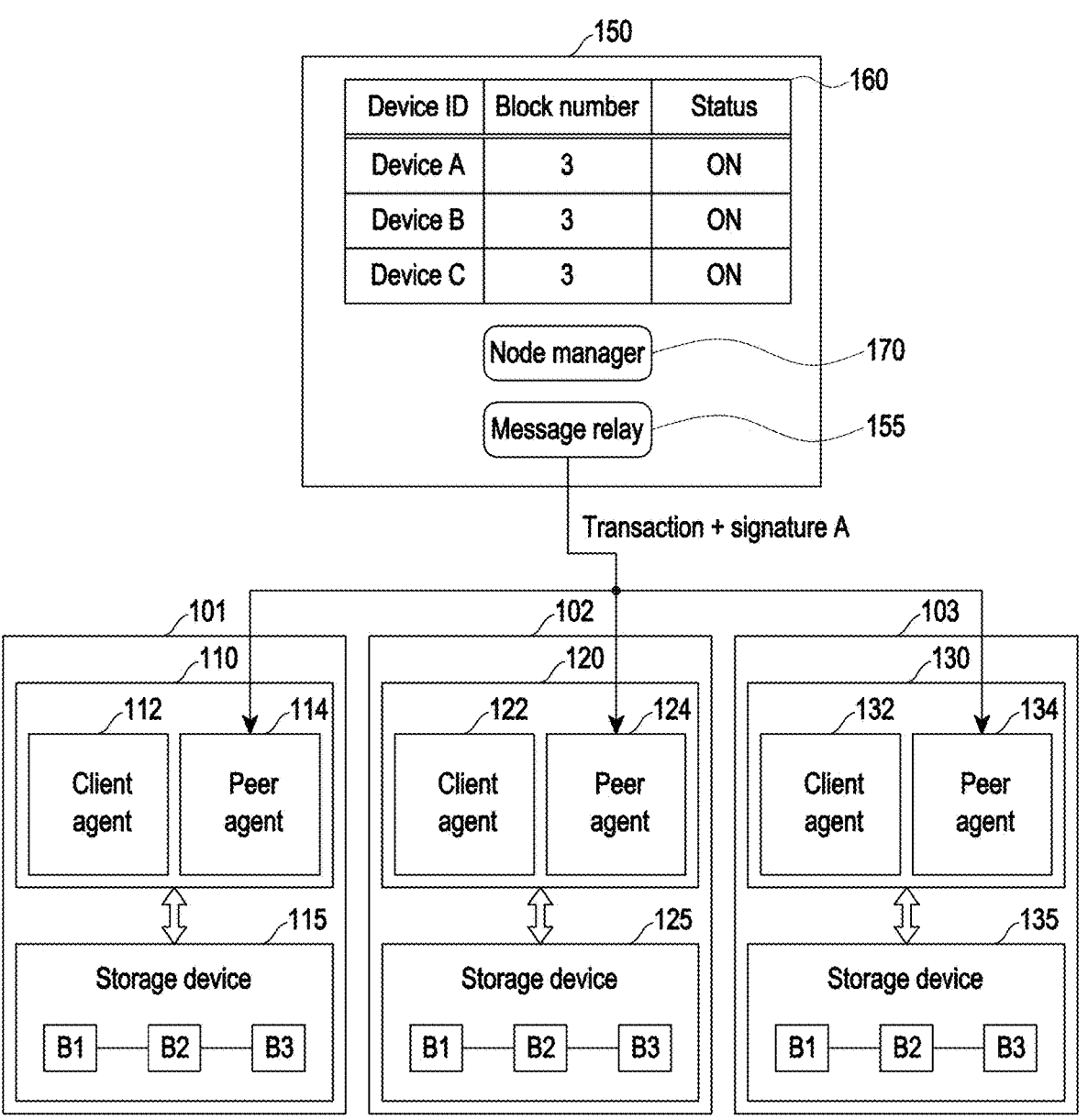

Referring to FIG. 3B, according to an embodiment, the server 150 may transmit the transaction information and the first signature information (signature A) to the nodes 101, 102, and 103 (e.g., the peer agents 114, 124, and 134) included in the blockchain network 140 through the message relay 155. Depending on the implementation, the server 150 may transmit the transaction information and the first signature information (signature A) to the nodes 102 and 103 other than the first electronic device 101.

Figure 3C:
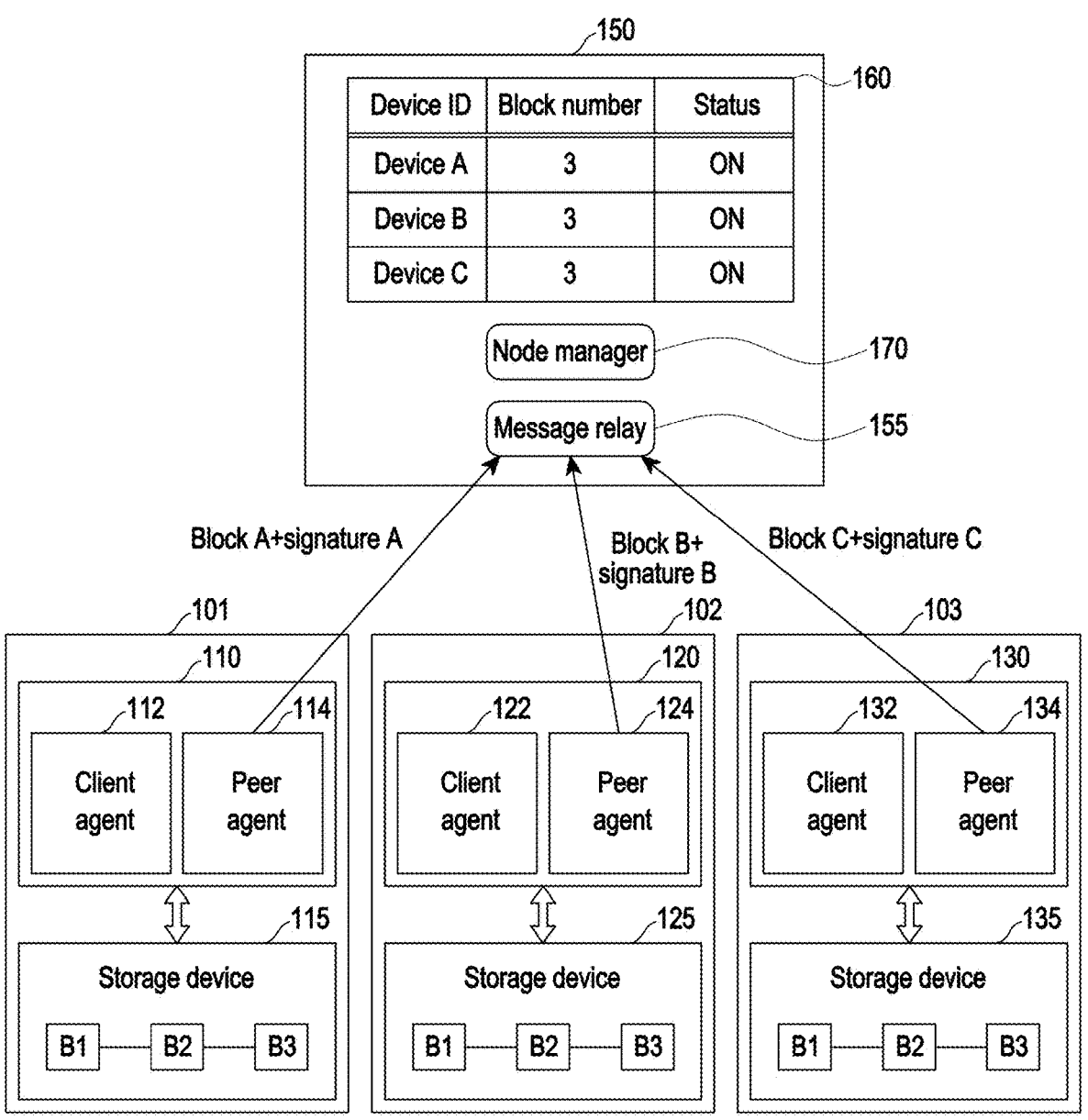

Referring to FIG. 3C, according to an embodiment, each of the nodes 101, 102, and 103 may generate a new block in response to receiving or identifying the transaction information and the first signature information (signature A). For example, the first electronic device 101 may generate block A including the transaction information, the second electronic device 102 may generate block B including the transaction information, and the third electronic device 103 may generate block C including the transaction information.

According to an embodiment, each of the nodes 101, 102, and 103 may transmit the generated block (block A, block B, or block C) and its signature information (signature A, signature B, or signature C) to the server 150 (e.g., the message relay 155) via the peer agent 114, 124, and 134.

Figure 3D:
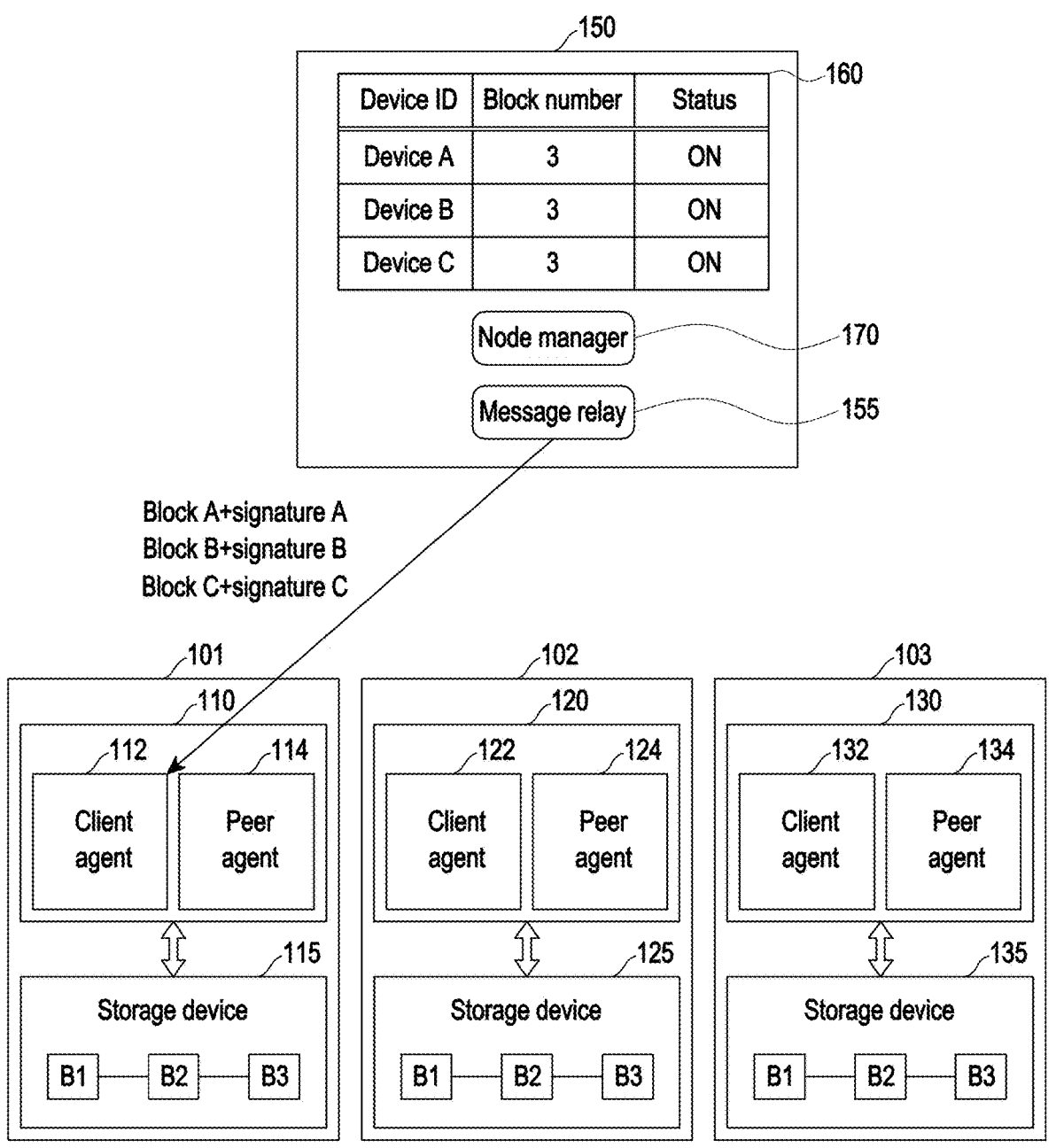

Referring to FIG. 3D, according to an embodiment, the first electronic device 101 may receive, from the server 150, information (blocks B and C) about blocks generated by the other nodes 102 and 103 and signature information (signature B and signature C) about the blocks.

According to an embodiment, the first electronic device 101 may identify, through the client agent 112, the consensus related to adding a new block (block A), based on the blocks (block B and block C) generated by the other nodes 102 and 103 and the signature information (signature B and signature C) about the other nodes 102 and 103. For example, the first electronic device 101 may identify the signature information (signature B and signature C) of the other nodes 102 and 103. Further, when it is identified that the number of blocks identical to the block (block A) generated by the first electronic device 101 among the blocks (block B and block C) generated by the other nodes 102 and 103 is greater than a designated number, it may be determined that the consensus for adding a new block to each node 101, 102, or 103 has been completed. Further, when it is identified that the number of blocks identical to the block (block A) generated by the first electronic device 101 among the blocks (block B and block C) generated by the other nodes 102 and 103 is greater than the designated number, the first electronic device 101 may determine a new block to be added to each node 101, 102, or 103 as "block A".

Figure 3E:
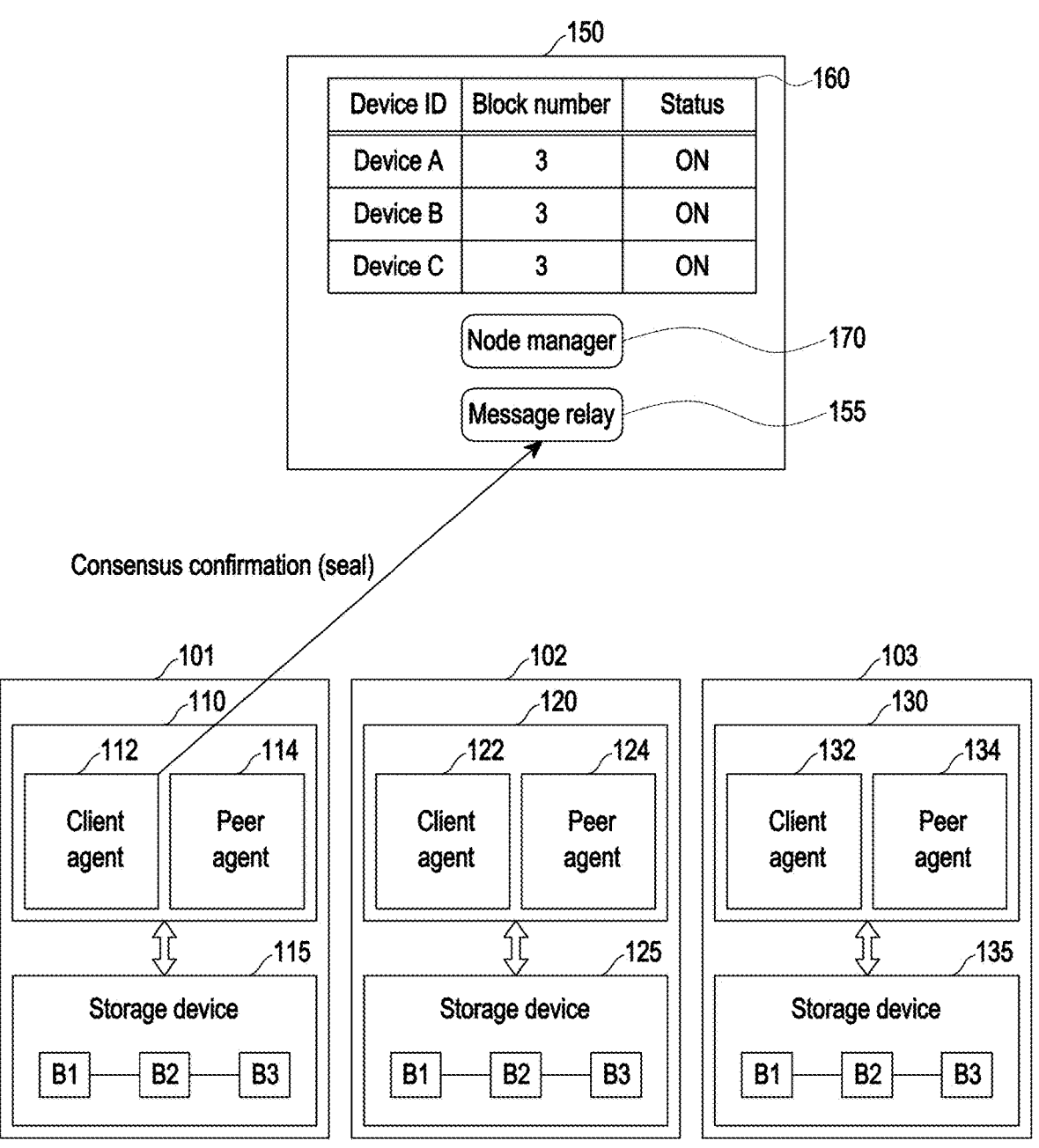

Referring to FIG. 3E, according to an embodiment, when it is determined that the consensus for adding a new block is completed through the client agent 112, the first electronic device 101 may transmit information (or consensus confirmation information) (e.g., a seal) indicating the consensus to the server 150 (or the message relay 155) so that the server 150 transmits the information indicating the consensus to the other nodes 102 and 103. For example, the first electronic device 101 may obtain or generate information indicating the consensus using signature information (signature A, signature B, and signature C) of each of the nodes 101, 102, and 103.

Figure 3F:
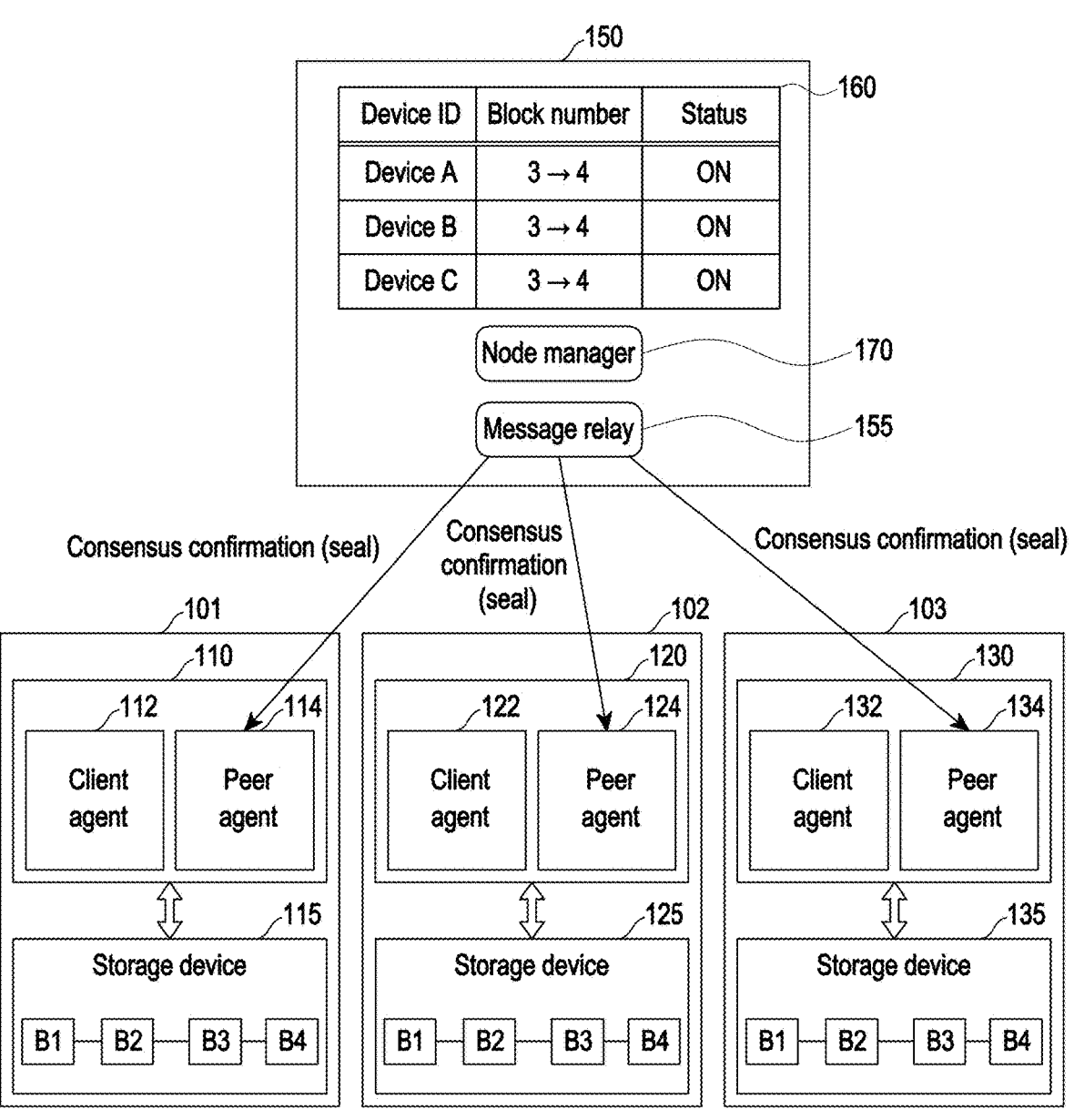

Referring to FIG. 3F, according to an embodiment, the server 150 may transmit information (or consensus confirmation information or seal) indicating the consensus to the nodes 101, 102, and 103 (e.g., the peer agents 114, 124, and 134) through the message relay 155.

According to an embodiment, each of the nodes 101, 102, and 103 may add and store a new block in each of the storage devices 115, 125, and 135 of the nodes 101, 102, and 103 in response to receiving or identifying information indicating the consensus.

According to an embodiment, the server 150 may update information about the block number of the table 160. For example, the server 150 may change the block number of each of the nodes included in the table 160 from "3" to "4".

According to the above-described operations of FIGS. 3A to 3F, nodes 101, 102, and 103 included in the blockchain network 140 may efficiently add new blocks.

Figure 4:
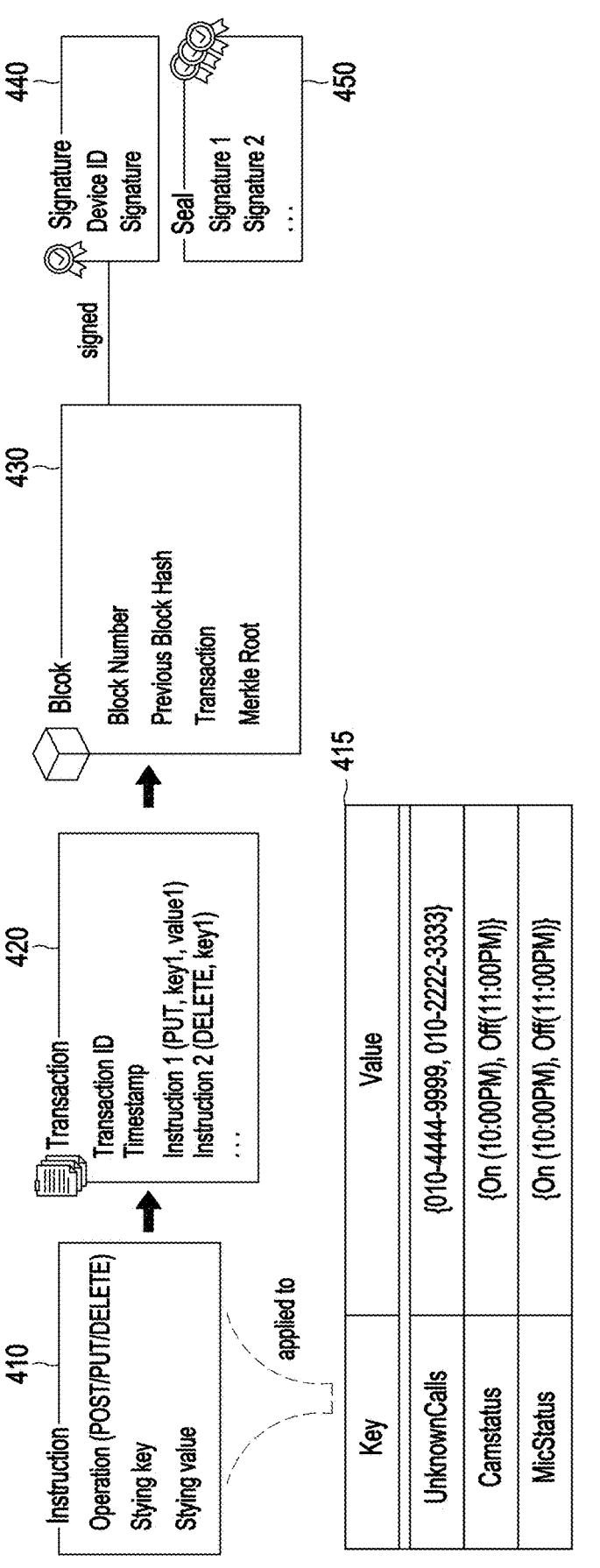
FIG. 4 is a view illustrating information related to a block according to an embodiment.

FIG. 4 is a view illustrating information related to a block according to an embodiment.

Referring to FIG. 4, according to an embodiment, transaction information 420 may be included or stored in a block 430.

According to an embodiment, the transaction information 420 may include a transaction ID, a timestamp, and at least one instruction. The transaction ID may include information for identifying the corresponding transaction. The timestamp may include information about the time when the corresponding transaction occurs. The instruction 410 may include a command (e.g., instruction 1 (PUT, key1, value1)) for performing a specific operation on a specific value included in the data table 415. For example, the instruction 410 may include a key, a value corresponding to the key, and a command for performing a specific operation (e.g., post, put, or delete) on the key and the value. For example, the key may indicate a specific key included in the data table 415, and the value may indicate a value indicated by the specific key included in the data table 415.

According to an embodiment, the block 430 may store information about a corresponding block. For example, the information about the block may include a block number, transaction information 420, previous hash information, and information about a Merkle root. For example, the block number may include information for identifying the corresponding block. The previous hash information may include hash information used in a previously generated block. The information about the Merkle root may include a final hash value derived from a data structure in which all transaction information included in the corresponding block 430 is summarized and expressed in a tree form. For example, the previous hash information and the Merkle root information may be used to verify or identify the integrity of the corresponding block 430.

According to an embodiment, the signature 440 may be used for the consensus for newly adding the block 430. For example, the signature 440 may include identification information about each of the nodes 101, 102, and 103 included in the blockchain network 140 and unique information (signature data) thereabout.

According to an embodiment, when it is identified that the consensus on the addition of the new block is completed, the node (e.g., the first electronic device 101) requesting to add the new block may generate information (e.g., seal) 450 indicating the consensus. For example, the information 450 indicating the consensus may be generated using the signatures of the agreeing nodes. For example, the information 450 indicating the consensus may include signatures or information obtained by hashing the signatures. When the nodes 101, 102, and 103 included in the blockchain network 140 receive and/or identify the information 450 indicating the consensus, the nodes 101, 102, and 103 may add and store the corresponding block 430 in a storage device (e.g., the storage device 115, 125, or 135 of FIG. 2).

Figure 5:
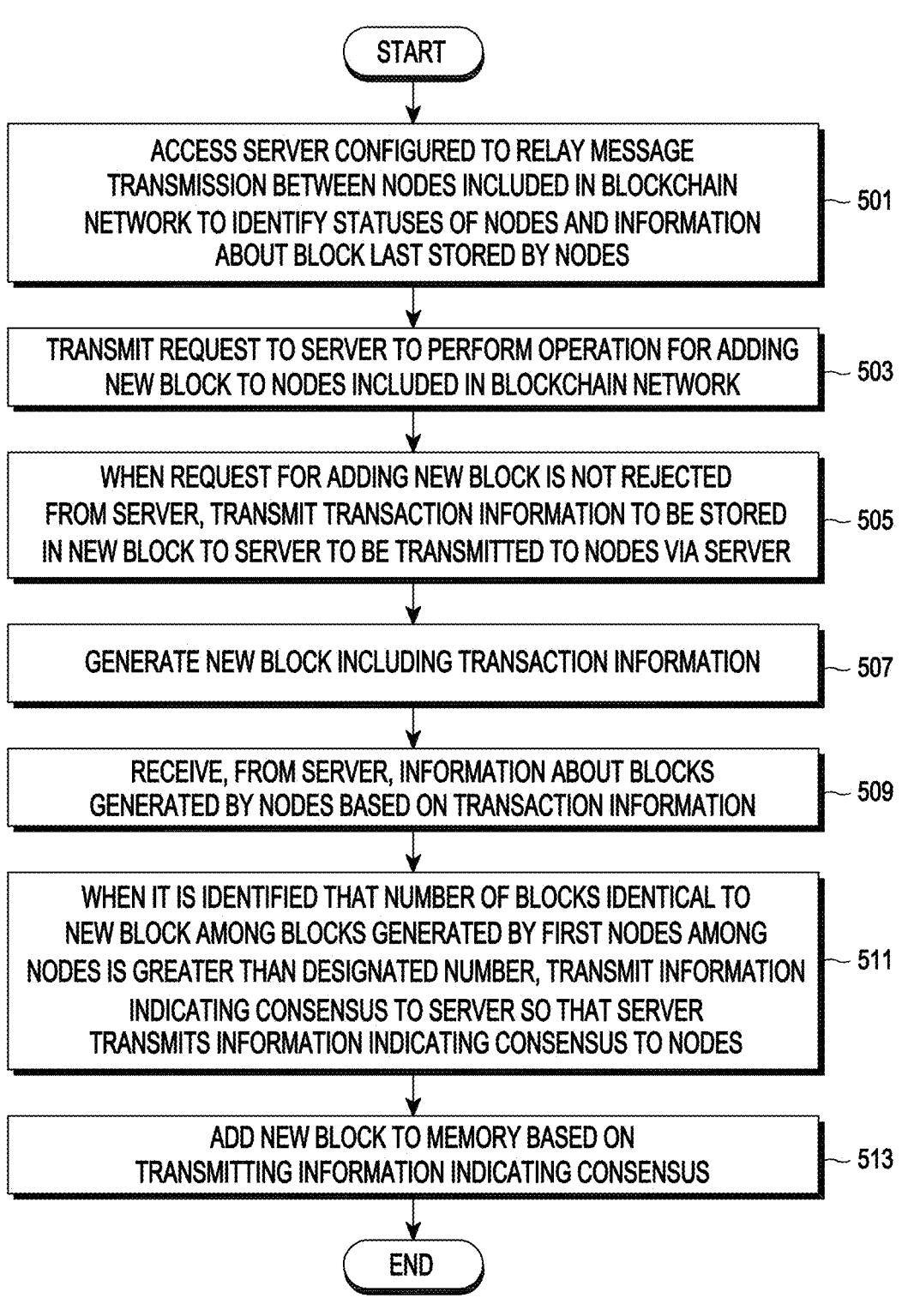
FIG. 5 is a flowchart illustrating a method for an electronic device included in a blockchain network to add a block according to an embodiment.

FIG. 5 is a flowchart illustrating a method for an electronic device included in a blockchain network to add a block according to an embodiment.

Referring to FIG. 5, according to an embodiment, in operation 501, an electronic device (e.g., the electronic device 101 of FIG. 1) may access a server (e.g., the server 150 of FIG. 1) configured to relay message transmission between electronic devices (e.g., the plurality of electronic devices 101, 102, and 103 of FIG. 1) corresponding to nodes included in a blockchain network (e.g., the blockchain network 140 of FIG. 1) to identify statuses of nodes (or electronic devices corresponding to nodes) and information about a block last stored by the nodes (or the electronic devices corresponding to the nodes). For example, the electronic device 101 may identify whether the nodes are in an active state (or an on state) or an inactive state (or an off state). For example, the active state may refer to a state in which a corresponding node may respond to transaction information. For example, the inactive state may mean a state in which a corresponding node may not respond to transaction information. Further, the electronic device 101 may identify information about the block last stored by each of the nodes (or electronic devices corresponding to the nodes). For example, the server 150 may provide information about the latest blocks of the electronic devices 101, 102, and 103 corresponding to the nodes included in the blockchain network 140 to the electronic devices 101, 102, and 103. For example, the information about the latest block may include information about a block last stored by each of electronic devices corresponding to the nodes included in the blockchain network 140.

Hereinafter, for convenience of description, electronic devices 101, 102, and 103 corresponding to the nodes included in the blockchain network 140 are described as nodes included in the blockchain network 140.

According to an embodiment, in operation 503, the electronic device 101 may transmit a request to the server 150 to perform an operation for adding a new block to the nodes 101, 102, and 103 included in the blockchain network 140. For example, the server 150 may provide a mutex function. For example, the mutex function may include the function of providing priority related to an operation of adding the new block to the node that has first requested. For example, when the priority related to the operation of adding the new block is given to a specific node, the server 150 may reject the requests from other nodes while the specific node adds the new block.

According to an embodiment, when the request for adding the new block is not rejected from the server 150, in operation 505, the electronic device 101 may transmit the transaction information to the server 150 so that the transaction information to be stored in the new block is transmitted to nodes via the server 150. The electronic device 101 may transmit the transaction information and information about the signature of the electronic device 101 to the server 150.

According to an embodiment, in operation 507, the electronic device 101 may generate a new block including transaction information. The electronic device 101 may transmit information about the new block to the server 150.

According to an embodiment, in operation 509, the electronic device 101 may receive, from the server 150, information about blocks generated by the nodes 102 and 103 included in the blockchain network 140, based on the transaction information. The electronic device 101 may receive, from the server 150, information about the signature of each of the nodes 102 and 103 together with blocks generated by the nodes 102 and 103.

According to an embodiment, the electronic device 101 may identify whether there is the consensus related to the addition of the new block, based on the blocks generated by the nodes 102 and 103 included in the blockchain network 140 and the information about the signature of each of the nodes 102 and 103. For example, when it is identified that the number of blocks identical to the new block generated by the electronic device 101 among the blocks generated by the nodes 102 and 103 included in the blockchain network 140 is greater than a designated number, the electronic device 101 may determine that the consensus for adding a new block to each node is completed. For example, the electronic device 101 may compare the previous hash information and Merkle root information included in the new block generated by the electronic device 101 with the previous hash information and Merkle root information included in the blocks generated by the other nodes 102 and 103. When the previous hash information and Merkle root information included in the new block generated by the electronic device 101 are the same as the previous hash information and Merkle root information included in the blocks generated by the other nodes 102 and 103, the electronic device 101 may determine that the new block generated by the electronic device 101 is identical to the blocks generated by the other nodes 102 and 103.

According to an embodiment, in operation 511, when it is identified that the number of blocks identical to the new block among the blocks generated by the first nodes (e.g., 102 and 103) in the active state among the nodes 102 and 103 included in the blockchain network 140 is greater than the designated number, the electronic device 101 may transmit information (e.g., a seal) indicating the consensus to the server 150 so that the server 150 transmits the information indicating the consensus to the nodes 102 and 103 included in the blockchain network 140. For example, the information indicating consensus may be obtained using information about the signature of each of the nodes 101, 102, and 103. For example, the designated number may be a threshold for the consensus for adding a new block between nodes. For example, the designated number may be set or determined to be smaller than a majority of all nodes included in the blockchain network 140. For example, the designated number may be set to a minimum criterion. For example, the designated number may be set to "1".

According to an embodiment, in operation 513, the electronic device 101 may add a new block to memory (e.g., the storage device 115 of FIG. 2) included in the electronic device 101, based on transmission of information indicating the consensus to the server 150. After transmitting the information indicating the consensus to the server 150, the server 150 may transmit the information indicating the consensus to each of the nodes 102 and 103. Thereafter, the new block may be added to the respective storage devices 125 and 135 of the nodes 102 and 103. For example, data to be shared between the nodes 101, 102, and 103 may be stored in the new block.

Figure 6:
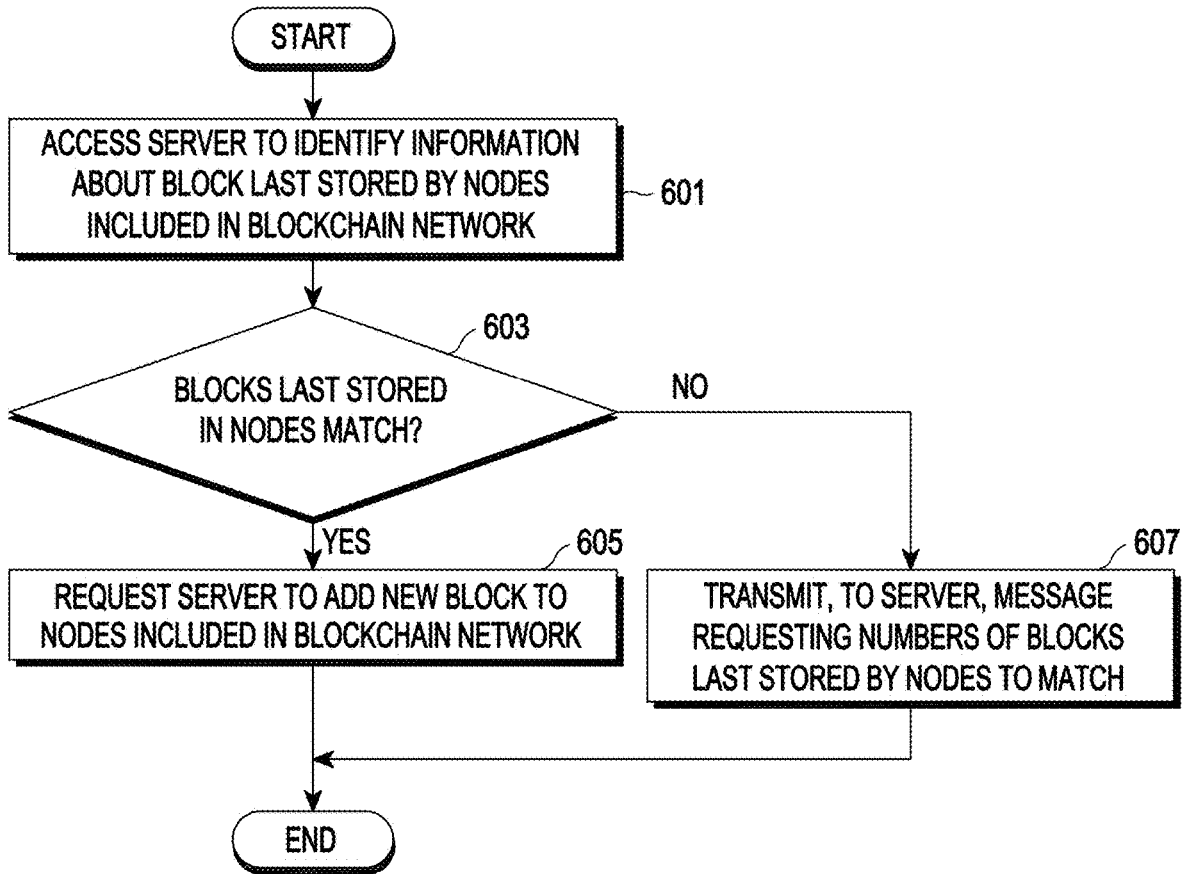
FIG. 6 is a flowchart illustrating a method for an electronic device included in a blockchain network to update block information to add a new block according to an embodiment.

FIG. 6 is a flowchart illustrating a method for an electronic device included in a blockchain network to update block information to add a new block according to an embodiment.

Referring to FIG. 6, according to an embodiment, in operation 601, an electronic device (e.g., the electronic device 101 of FIG. 1) may access a server (e.g., the server 150 of FIG. 1) configured to relay message transmission between electronic devices (e.g., the plurality of electronic devices 101, 102, and 103 of FIG. 1) corresponding to nodes included in a blockchain network (e.g., the blockchain network 140 of FIG. 1) to identify information about a block last stored by the nodes (or the electronic devices corresponding to the nodes). For example, the electronic device 101 may identify information (e.g., the number of the block last stored or the total number of blocks stored) about the block last stored by the nodes (or the electronic devices corresponding to the nodes) through the table 160 of the server 150.

According to an embodiment, in operation 603, the electronic device 101 may identify whether the blocks last stored in the nodes 101, 102, and 103 included in the blockchain network 140 match.

According to an embodiment, based on identifying that the blocks last stored in the nodes 101, 102, and 103 match (Yes in operation 603), the electronic device 101 in operation 605 may request the server 150 to add a new block to the nodes 101, 102, and 103 included in the blockchain network 140.

According to an embodiment, based on identifying that the blocks last stored in the nodes 101, 102, and 103 do not match (No in operation 603), the electronic device 101 in operation 607 may transmit, to the server 150, a message requesting that the numbers of the blocks last stored in the nodes 101, 102, and 103 match. For example, before requesting to add a new block to the nodes 101, 102, and 103, the electronic device 101 may match the blocks (or block numbers) stored in the nodes 101, 102, and 103.

Through the above-described operations, the electronic device 101 may update the latest block information when adding a new block. Accordingly, the electronic device 101 may determine or derive the consensus for adding a new block based on the latest block stored in the nodes 101, 102, and 103.

FIGS. 7A, 7B, 7C, 7D, and 7E are views illustrating a method for an electronic device included in a blockchain network to update block information to add a new block according to an embodiment.

Figure 7A:
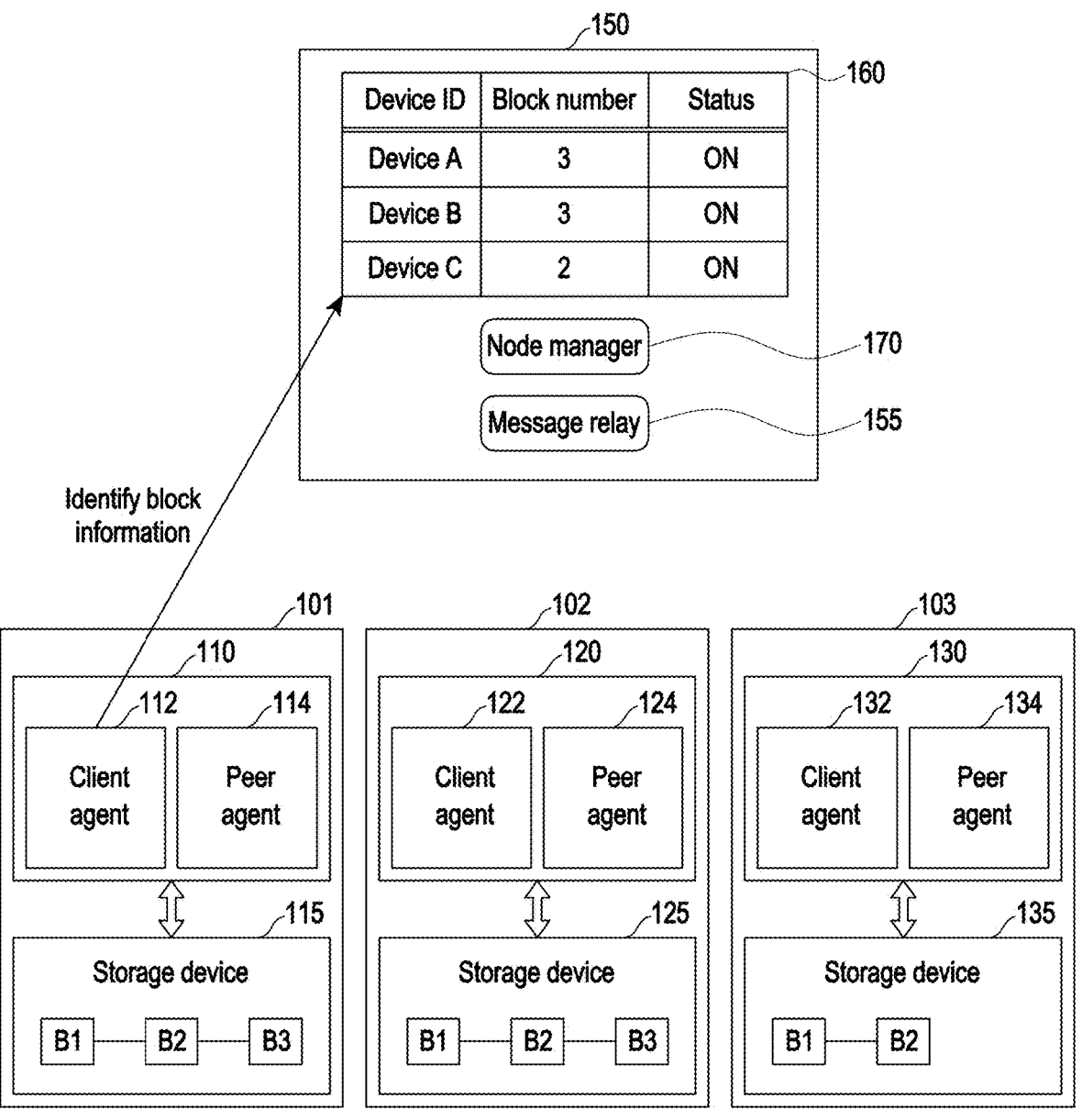
FIGS. 7A, 7B, 7C, 7D, and 7E are views illustrating a method for an electronic device included in a blockchain network to update block information to add a new block according to an embodiment.

Referring to FIG. 7A, according to an embodiment, the first electronic device 101 may access the server 150 (e.g., the server 150 of FIG. 1) to identify the information about the block last stored by each of the nodes included in the blockchain network (e.g., the blockchain network 140 of FIG. 1).

According to an embodiment, the electronic device 101 may identify whether the blocks last stored in the nodes 101, 102, and 103 included in the blockchain network 140 match. For example, the first node (e.g., device A) may store three blocks B0, B1, and B2, and the number of the block last stored in the first node may be "3". The second node (e.g., device B) may store three blocks B0, B1, and B2, and the number of the block last stored in the second node may be "3". The third node (e.g., device C) may store two blocks B0 and B1, and the number of the block last stored in the third node may be "2". For example, the numbers of the blocks may sequentially increase according to the order in which the blocks are stored.

According to an embodiment, the electronic device 101 may identify that the blocks last stored in the nodes 101, 102, and 103 do not match.

Figure 7B:
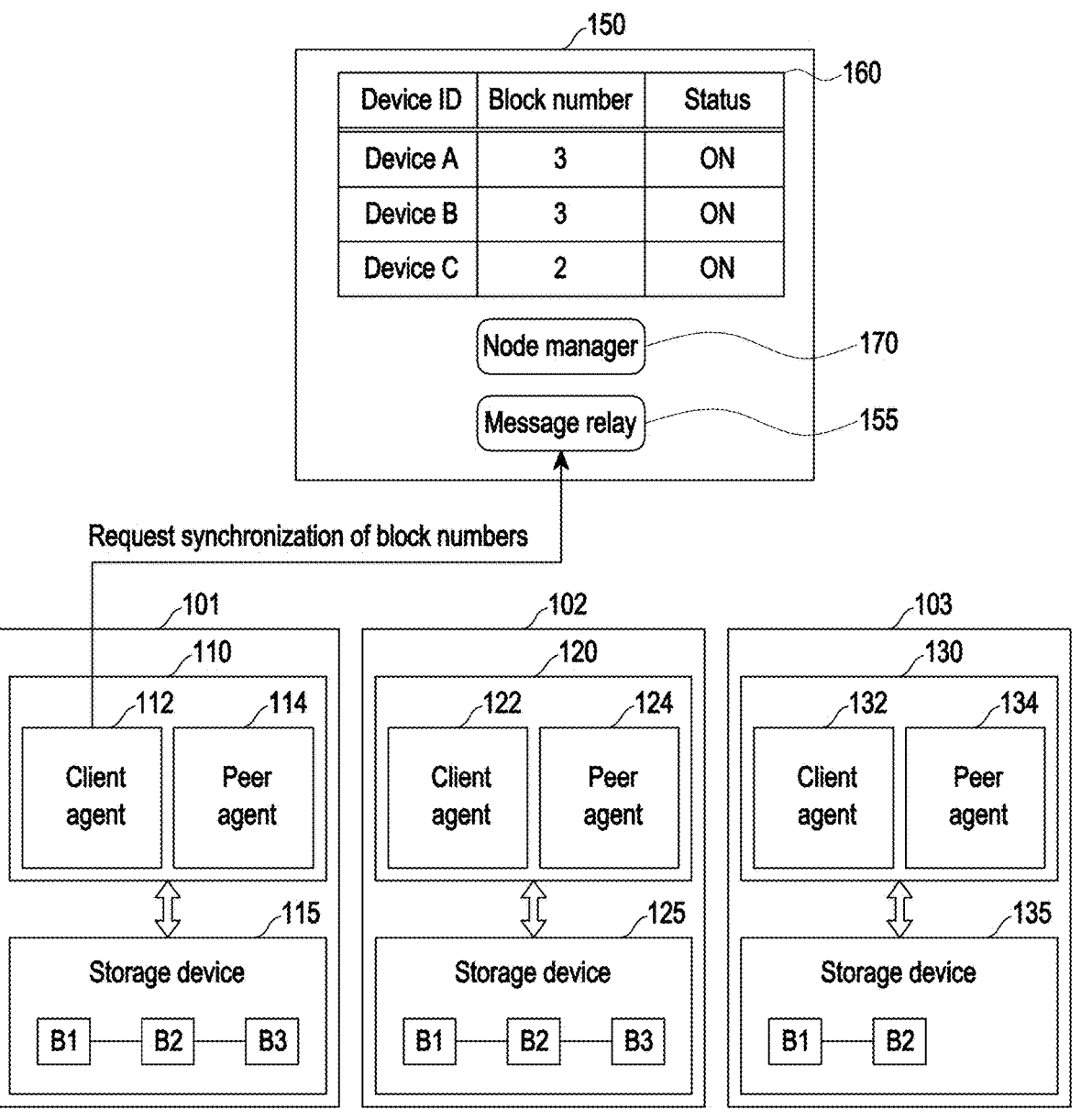

Referring to FIG. 7B, based on identifying that the blocks last stored in the nodes 101, 102, and 103 do not match, the electronic device 101 may request the server 150 to match the numbers of the blocks last stored in the nodes 101, 102, and 103. For example, the electronic device 101 may transmit a message for requesting synchronization of the block numbers to the server 150 (e.g., the message relay 155).

Figure 7C:
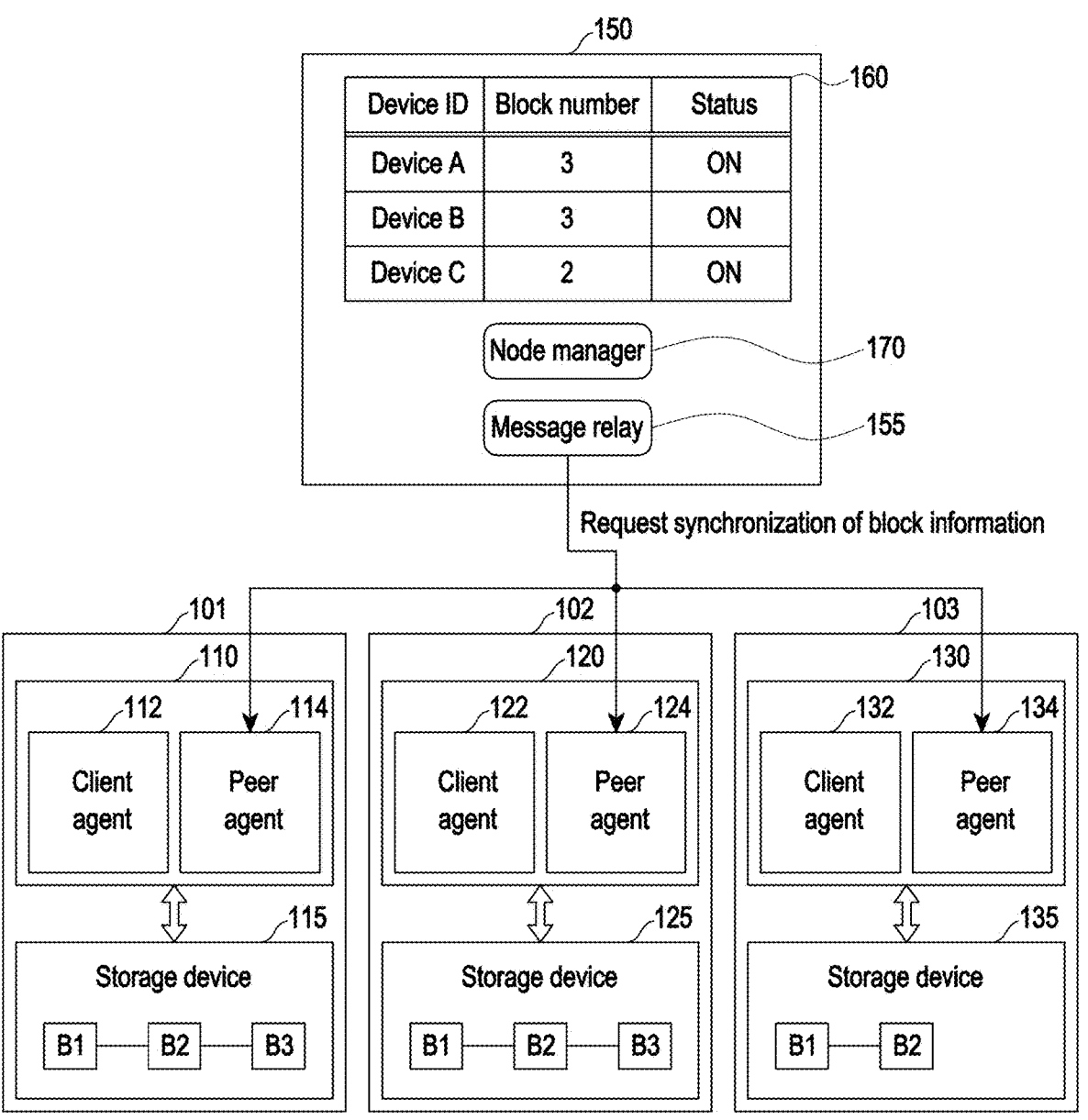

Referring to FIG. 7C, the server 150 may transmit a message for requesting synchronization of the block numbers to the nodes 101, 102, and 103 or the electronic devices (device A, device B, and device C) corresponding to the nodes. For example, the server 150 may transmit the message to the nodes 101, 102, and 103 through the message relay 155. The server 150 may transmit information (e.g., block B2) about the latest block to the nodes 101, 102, and 103 or electronic devices (device A, device B, and device C) corresponding to the nodes. For example, information about the latest block may be included in the message for requesting synchronization of the block numbers. Alternatively, the server 150 may separately transmit information about the latest block to the nodes 101, 102, and 103.

According to an embodiment, each of the nodes 101, 102, and 103 may update the block information in response to identifying the message for requesting synchronization of the block numbers. For example, the third electronic device 103 may add the latest block (e.g., block B2) based on the information about the latest block (e.g., block B2) obtained from the server 150. Since the first electronic device 101 and the second electronic device 102 already store the latest block (e.g., block B2), the latest block may not be added.

Figure 7D:
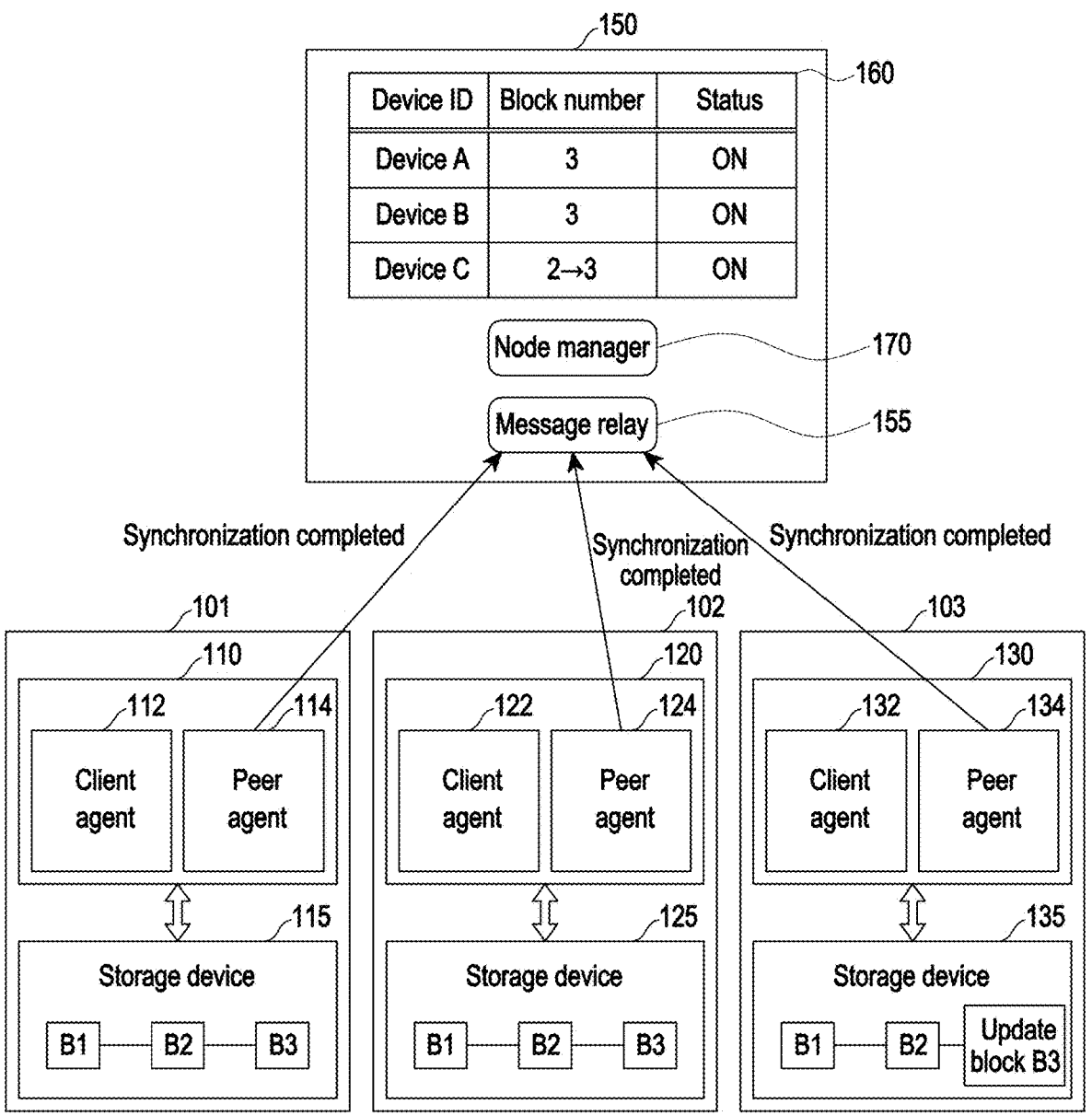

Referring to FIG. 7D, according to an embodiment, each of the nodes 101, 102, and 103 may transmit a message indicating completion of synchronization to the server 150 (e.g., the message relay 155) through the peer agent 114, 124, and 134.

Figure 7E:
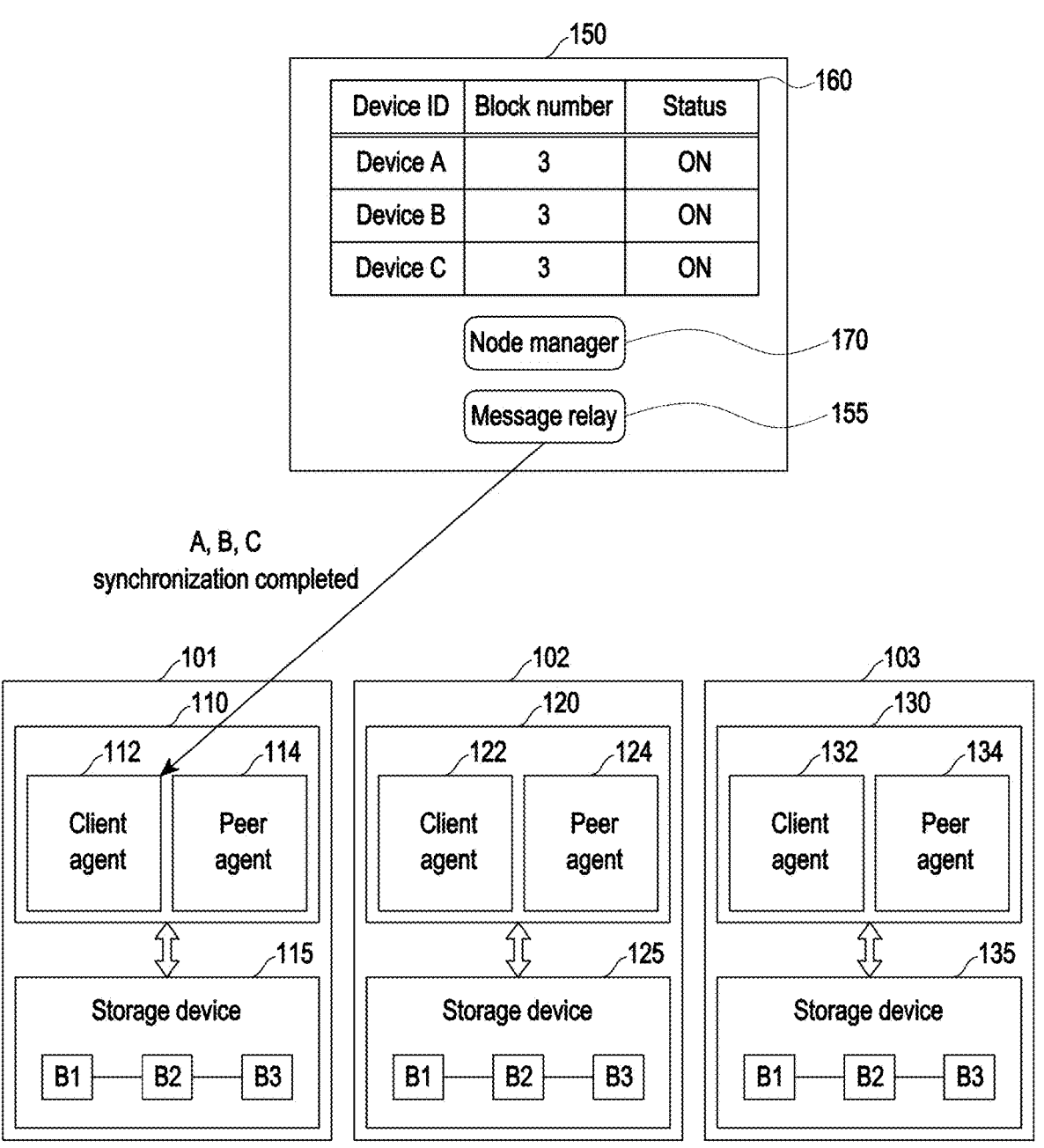

Referring to FIG. 7E, according to an embodiment, the server 150 may transmit a message indicating completion of synchronization to the first electronic device 101. When the first electronic device 101 identifies the message indicating synchronization completion, the first electronic device 101 may transmit a message for adding a new block to the server 150.

Through the above-described operations, the electronic device 101 may update the latest block information when adding a new block. Accordingly, the electronic device 101 may determine or derive the consensus for adding a new block based on the latest block stored in the nodes 101, 102, and 103.

Figure 8:
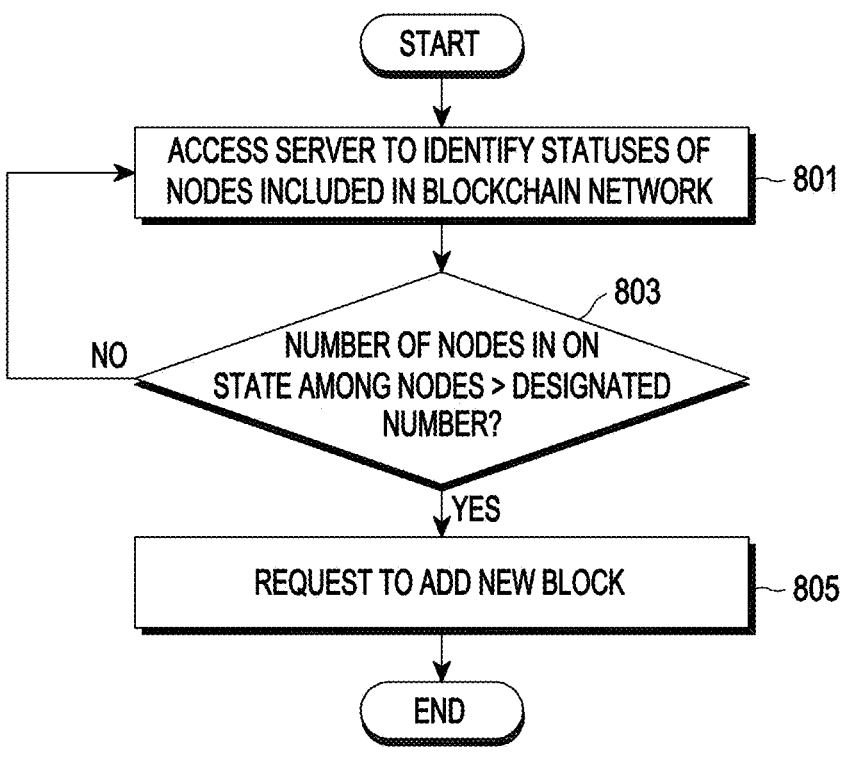
FIG. 8 is a flowchart illustrating a method for an electronic device included in a blockchain network to identify whether agreement conditions between nodes for adding a new block are met according to an embodiment.

FIG. 8 is a flowchart illustrating a method for an electronic device included in a blockchain network to identify whether agreement conditions between nodes for adding a new block are met according to an embodiment.

Referring to FIG. 8, according to an embodiment, in operation 801, an electronic device (e.g., the electronic device 101 of FIG. 1) may access a server (e.g., the server 150 of FIG. 1) configured to relay message transmission between electronic devices (e.g., the plurality of electronic devices 101, 102, and 103 of FIG. 1) corresponding to nodes included in a blockchain network (e.g., the blockchain network 140 of FIG. 1) to identify the statuses of the nodes (or the electronic devices corresponding to the nodes). For example, the electronic device 101 may identify the number of nodes in an on state or an active state among the nodes included in the blockchain network 140. For example, the on state or the active state may refer to a state in which a corresponding node may immediately respond to transaction information. For example, the off state or the inactive state may mean a state in which a corresponding node may not immediately respond to transaction information.

According to an embodiment, in operation 803, the electronic device 101 may identify whether the number of nodes in the on state (or the active state) among the nodes 101, 102, and 103 included in the blockchain network 140 is greater than a designated number. For example, the designated number may indicate a threshold (e.g., f-tolerance) for the consensus condition for adding a new block.

According to an embodiment, when it is identified that the number of nodes in the on state among the nodes 101, 102, and 103 included in the blockchain network 140 is greater than the designated number (Yes in operation 803), the electronic device 101 in operation 805 may request the server 150 to add a new block to the nodes 101, 102, and 103. For example, when it is identified that the number of nodes in the on state among the nodes 101, 102, and 103 included in the blockchain network 140 is greater than the designated number, the electronic device 101 may identify or determine that the condition for the number of nodes among the consensus conditions for adding a new block is met.

According to an embodiment, when it is identified that the number of nodes in the on state among the nodes 101, 102, and 103 included in the blockchain network 140 is not greater than the designated number (No in operation 803), the electronic device 101 in operation 801 may identify the statuses of the nodes (or the electronic devices corresponding to the nodes). For example, when it is identified that the number of nodes in the on state among the nodes 101, 102, and 103 included in the blockchain network 140 is not greater than the designated number, the electronic device 101 may identify or determine that the condition for the number of nodes among the consensus conditions for adding a new block is not met. The electronic device 101 may hold the operation for adding a new block until the number of nodes in the on state is greater than the designated number (or until the condition for the number of nodes is met).

Figure 9A:
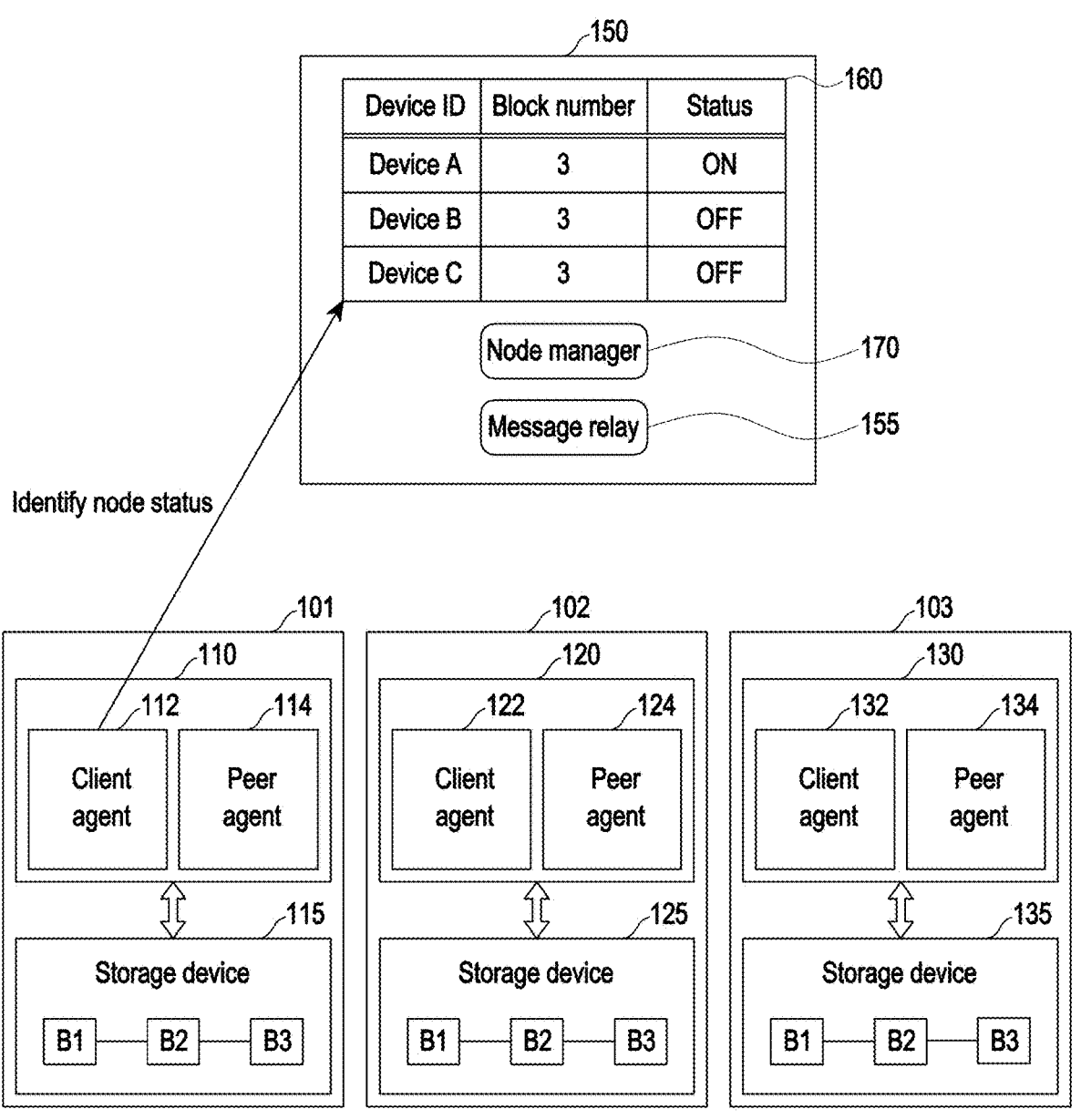
FIGS. 9A, 9B, and 9C are views illustrating a method for an electronic device included in a blockchain network to identify whether agreement conditions between nodes for adding a new block are met according to an embodiment.
Figure 9B:
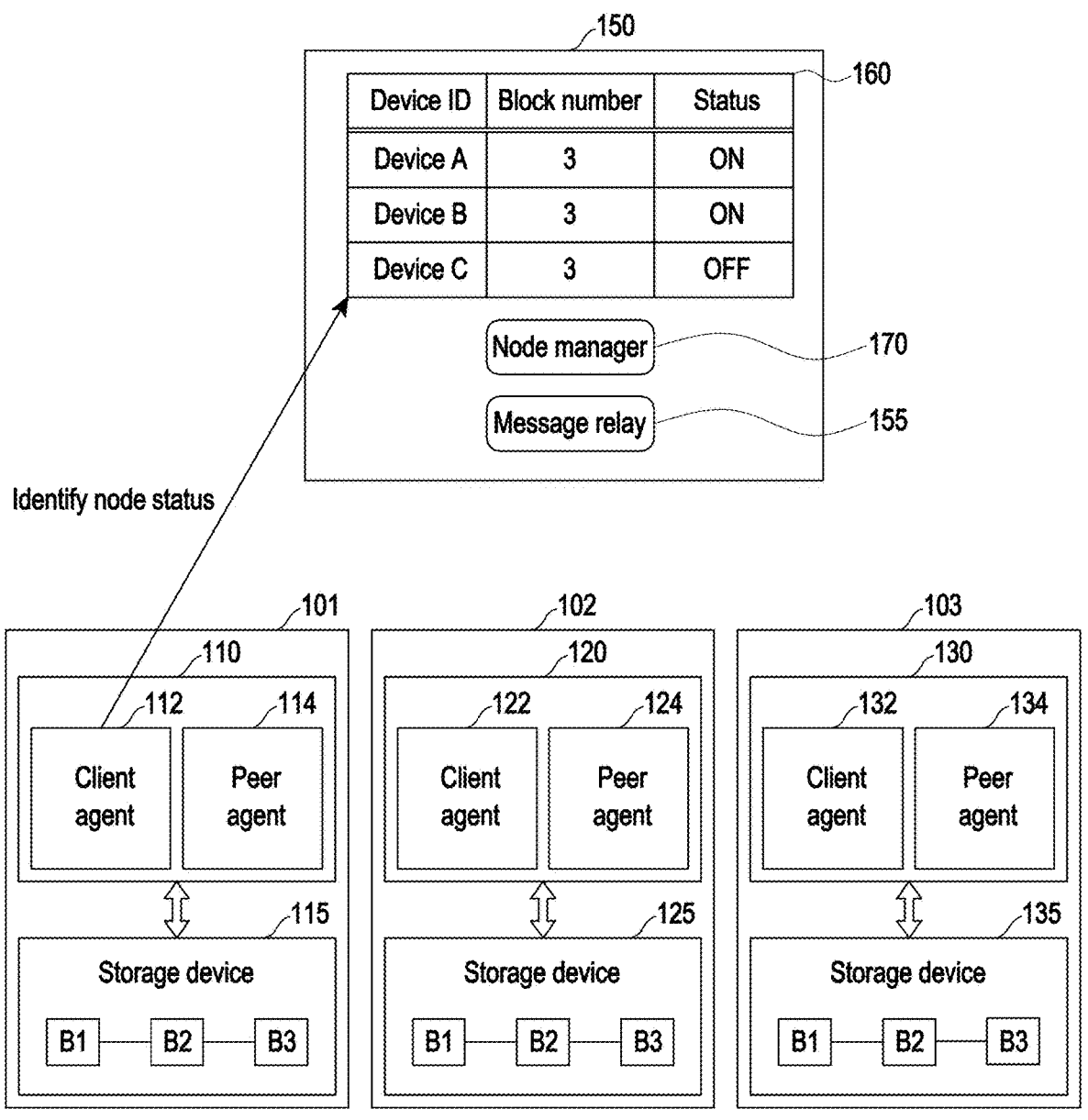
Figure 9C:
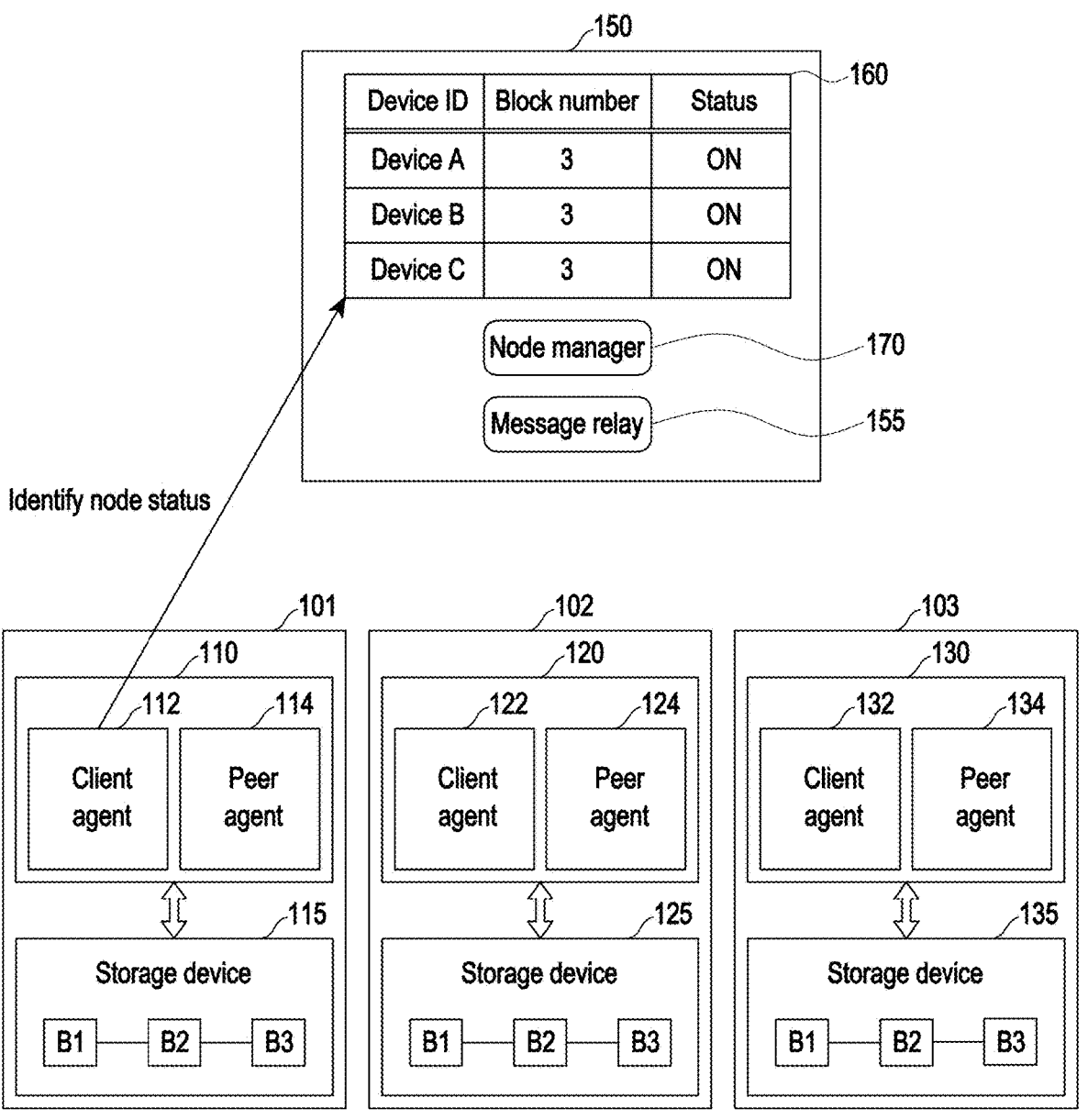

FIGS. 9A, 9B, and 9C are views illustrating a method for an electronic device included in a blockchain network to identify whether agreement conditions between nodes for adding a new block are met according to an embodiment.

Referring to FIGS. 9A to 9C, according to an embodiment, the first electronic device 101 may access the server 150 (e.g., the server 150 of FIG. 1) to identify the statuses (e.g., on or off states) of nodes included in a blockchain network (e.g., the blockchain network 140 of FIG. 1). For example, the first electronic device 101 may access the server 150 (e.g., the table 160) to identify the statuses of the nodes 101, 102, and 103.

For example, the electronic device 101 may identify the number of nodes in an on state (or an active state) among the nodes included in the blockchain network 140. According to an embodiment, the electronic device 101 may identify whether the number of nodes in the on state (or the active state) among the nodes 101, 102, and 103 included in the blockchain network 140 is greater than a designated number. For example, the designated number may indicate a threshold (e.g., f-tolerance) for the consensus condition for adding a new block. For example, the designated number may be set to a minimum criterion. For example, the designated number may be set to "1".

Referring to FIG. 9A, according to an embodiment, a first node (e.g., device A) may be in the on state, a second node (e.g., device B) may be in the off state, and a third node (e.g., device C) may be in the off state. For example, there may be one node in the on state. For example, when the designated number is set to "1", the number of nodes in the on state may not be greater than the designated number. In this case, since the consensus condition for adding the new block is not met, the electronic device 101 may not add a new block.

Referring to FIG. 9B, according to an embodiment, a first node (e.g., device A) may be in the on state, a second node (e.g., device B) may be in the on state, and a third node (e.g., device C) may be in the off state. For example, there may be two nodes in the on state. For example, when the designated number is set to "1", the number of nodes in the on state may be greater than the designated number. In this case, the electronic device 101 may transmit a message for adding a new block to the nodes 101 and 102 to the server 150 because the condition for the number of nodes among the consensus conditions for adding a new block is met.

Referring to FIG. 9C, according to an embodiment, a first node (e.g., device A) may be in the on state, a second node (e.g., device B) may be in the on state, and a third node (e.g., device C) may be in the on state. For example, there may be three nodes in the on state. For example, when the designated number is set to "1", the number of nodes in the on state may be greater than the designated number. In this case, the electronic device 101 may transmit a message for adding a new block to the nodes 101, 102, and 103 to the server 150 because the condition for the number of nodes among the consensus conditions for adding a new block is met.

Through the above-described method, the consensus condition (e.g., a designated number) for adding a new block to the nodes 101, 102, and 103 may be determined or set as a mitigated criterion (e.g., a minimum criterion). For example, the designated number may be determined or set by the server 150. Thus, the electronic device 101 may maximally mitigate the consensus conditions for other nodes included in the blockchain network 140, thereby increasing the usability of data sharing through blocks.

Figure 10:
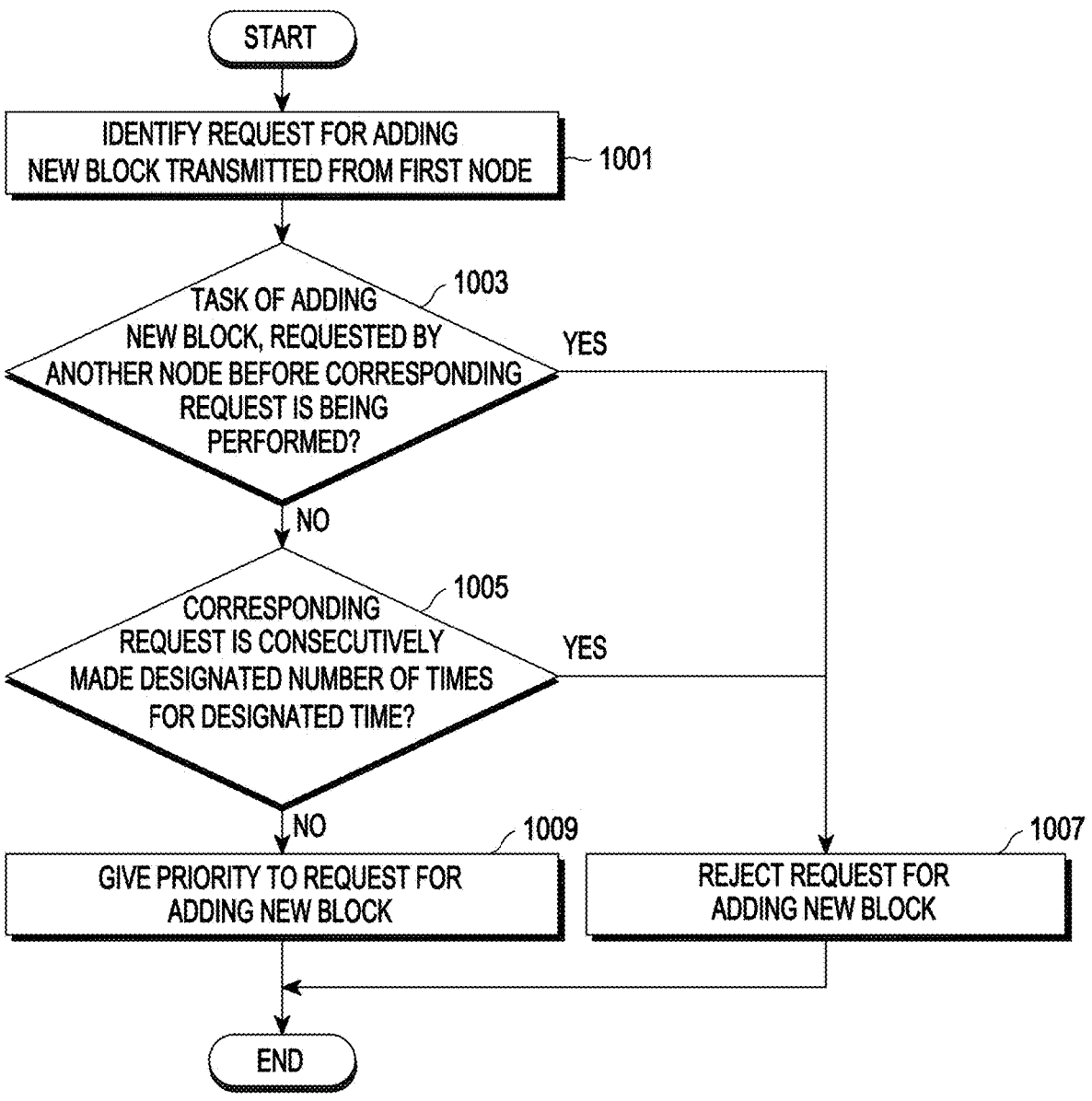
FIG. 10 is a flowchart illustrating a method for a server to reject a request for adding a new block according to an embodiment.

FIG. 10 is a flowchart illustrating a method for a server to reject a request for adding a new block according to an embodiment.

Referring to FIG. 10, according to an embodiment, in operation 1001, a server (e.g., the server 150 of FIG. 1) may identify a request for adding a new block transmitted from a first node (or a first electronic device) 101. The server 150 may provide a mutex function.

According to an embodiment, in operation 1003, the server 150 may identify whether a task of adding a new block requested from another node before the corresponding request is being performed. For example, the server 150 may identify whether a task of adding a new block requested from another node is to be completed before acting on the corresponding request transmitted from the first node. Here, the task of adding a new block requested from another node may have started to be being performed, or may not yet have stated to be performed.

According to an embodiment, when it is identified that the task of adding the new block requested from the other node before the corresponding request is being performed (Yes in operation 1003), in operation 1007, the server 150 may reject the request for adding the new block by the first node 101. For example, when it is identified that the task of adding the new block requested from the other node is to be completed before acting on the corresponding request transmitted from the first node, the server 150 may reject the request for adding the new block by the first node 101. For example, after the task of adding the new block requested from the other node is completed, the server 150 may perform the task for the request for adding the new block by the first node 101.

According to an embodiment, when it is identified that the task of adding the new block requested from the other node before the corresponding request is not being performed (No in operation 1003), in operation 1005, the server 150 may identify whether the corresponding request has been consecutively requested a designated number of times for a designated time. For example, when it is identified that the task of adding the new block requested from the other node is not to be completed before acting on the corresponding request transmitted from the first node, the server 150 may identify whether the corresponding request transmitted from the first node 101 has been consecutively requested a designated number of times for a designated time. For example, the server 150 may perform operation 1005 for preventing consensus interference by one node.

According to another embodiment, operation 1005 may be omitted. For example, according to an embodiment, when it is identified that the task of adding the new block requested from the other node before the corresponding request is not being performed (No in operation 1003), the server 150 may give priority to the request for adding the new block to the first node 101. For example, when it is identified that the task of adding the new block requested from the other node is not to be completed before acting on the corresponding request transmitted from the first node, the server 150 may give priority to the request for adding the new block transmitted from the first node 101. For example, the server 150 may perform a series of tasks for adding a new block requested by the first node 101.

According to an embodiment, when it is identified that the corresponding request transmitted from the first node 101 is consecutively requested the designated number of times for the designated time (Yes in operation 1005), in operation 1007, the server 150 may reject the request for adding the new block transmitted from the first node 101. For example, after the designated time elapses, the server 150 may perform the task for the request for adding a new block transmitted from the first node 101.

According to an embodiment, when it is identified that the corresponding request transmitted from the first node 101 is consecutively requested the designated number of times for the designated time (No in operation 1005), in operation 1009, the server 150 may give priority for the request for adding the new block to the first node 101. For example, the server 150 may perform a series of tasks for adding a new block requested by the first node 101. The server 150 may reject a request for adding a new block by another node 102 or 103 while the series of tasks for adding the new block requested by the first node 101 are performed.

Based on the above-described method, the server 150 may prevent consensus conflict between the nodes 101, 102, and 103. Further, the server 150 may prevent consensus interference by one node included in the blockchain network 140.

The above-described electronic device (or first electronic device) 101 may be implemented to be identical or similar to the electronic device 1101 described below.

Figure 11:
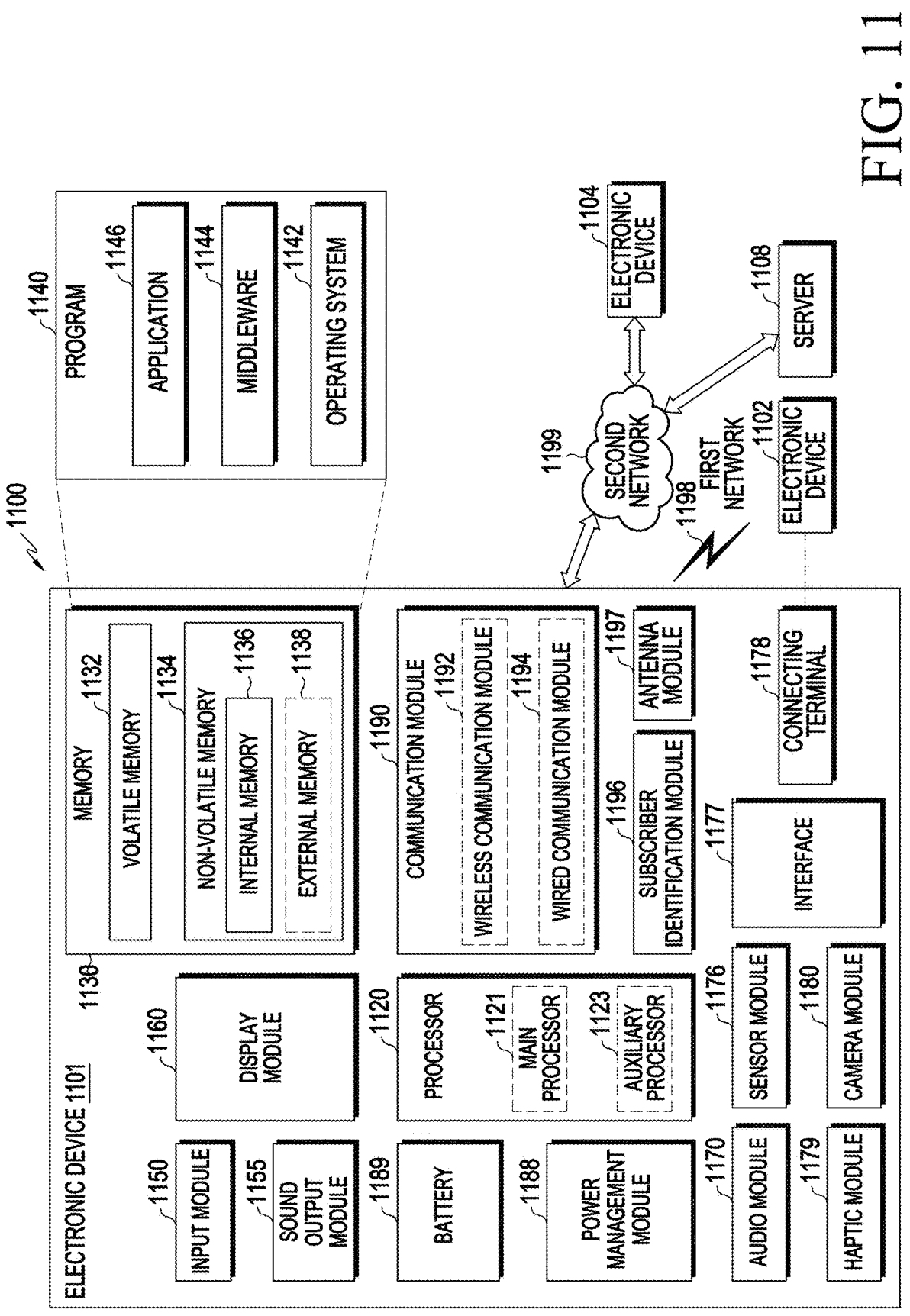
FIG. 11 is a view illustrating an electronic device in a network environment according to various embodiments.

FIG. 11 is a block diagram illustrating an electronic device 1101 in a network environment 1100 according to various embodiments.

Referring to FIG. 11, the electronic device 1101 in the network environment 1100 may communicate with at least one of an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In an embodiment, at least one (e.g., the connecting terminal 1178) of the components may be omitted from the electronic device 1101, or one or more other components may be added in the electronic device 101. According to an embodiment, some (e.g., the sensor module 1176, the camera module 1180, or the antenna module 1197) of the components may be integrated into a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to an embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 1101 includes the main processor 1121 and the auxiliary processor 1123, the auxiliary processor 1123 may be configured to use lower power than the main processor 1121 or to be specified for a designated function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 123. According to an embodiment, the auxiliary processor 1123 (e.g., the neural processing unit) may include a hardware structure specified for artificial intelligence model processing. The artificial intelligence model may be generated via machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by other component (e.g., the processor 1120) of the electronic device 1101, from the outside (e.g., a user) of the electronic device 1101. The input module 1150 may include, for example, a microphone, a mouse, a keyboard, keys (e.g., buttons), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor configured to detect a touch, or a pressure sensor configured to measure the intensity of a force generated by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 101, and then generate an electrical signal or data value corresponding to the detected state. According to an embodiment, the sensor module 1176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, an HDMI connector, a USB connector, an SD card connector, or an audio connector (e.g., a headphone connector).

The haptic module 1179 may convert an electrical signal into a mechanical stimulus (e.g., a vibration or motion) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device 1104 via a first network 1198 (e.g., a short-range communication network, such as Bluetooth™, wireless-fidelity (Wi-Fi) direct, or infrared data association (IrDA)) or a second network 1199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 1192 may identify or authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the millimeter wave (mm Wave) band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device). According to an embodiment, the antenna module 1197 may include one antenna including a radiator formed of a conductor or conductive pattern formed on a substrate (e.g., a printed circuit board (PCB)). According to an embodiment, the antenna module 1197 may include a plurality of antennas (e.g., an antenna array). In this case, at least one antenna appropriate for a communication scheme used in a communication network, such as the first network 1198 or the second network 1199, may be selected from the plurality of antennas by, e.g., the communication module 1190. The signal or the power may then be transmitted or received between the communication module 1190 and the external electronic device via the selected at least one antenna. According to an embodiment, other parts (e.g., radio frequency integrated circuit (RFIC)) than the radiator may be further formed as part of the antenna module 1197.

According to various embodiments, the antenna module 1197 may form a mmWave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. The external electronic devices 1102 or 1104 each may be a device of the same or a different type from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an Internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

An electronic device (e.g., electronic device 101) according to an embodiment comprises a communication circuit (e.g., communication module 1190), memory (e.g., storage device 115 or memory 1130) storing one or more computer programs, and one or more processors (e.g., processor 1120) communicatively coupled to the communication circuit and the memory. According to an embodiment, the one or more computer programs include computer-executable instructions that, when executed by the one or more processors, cause the electronic device to transmit a request, through the communication circuit to a server (e.g., server 150) configured to relay message transmission between nodes (e.g., nodes 101, 102, and 103) included in a blockchain network (e.g., blockchain network 140) to add a new block to the nodes included in the blockchain network, when the request is not rejected by the server, transmit, through the communication circuit to the server for transmission to the nodes via the server, transaction information to be stored in the new block, generate the new block including the transaction information, receive, through the communication circuit from the server, information about blocks generated by first nodes in an active state among the nodes, based on identifying that a number of blocks identical to the new block among the blocks generated by the first nodes is greater than a designated number, transmit, through the communication circuit to the server, information indicating agreement on adding the new block, and based on the transmitting, to the server, of the information indicating the agreement, add the new block to the memory.

According to an embodiment, the one or more computer programs further include computer-executable instructions that, when executed by the one or more processors, cause the electronic device to access the server, through the communication circuit, to identify information about a block last stored in each of the nodes and a state of the nodes.

According to an embodiment, the one or more computer programs further include computer-executable instructions that, when executed by the one or more processors, cause the electronic device to, based on identifying that the block last stored in each of the nodes differ from each other, transmit, through the communication circuit to the server, a message requesting the block last stored in each of the nodes to match.

According to an embodiment, the one or more computer programs further include computer-executable instructions that, when executed by the one or more processors, cause the electronic device to, based on identifying that a number of a block last stored in the electronic device is smaller than a number of a block last stored in another node in the active state among nodes different from the electronic device, receive, through the communication circuit from the server, information about the block last stored in the another nodes, and update the block last stored in the memory based on the received information.

According to an embodiment, wherein the request to add the new block to the nodes included in the blockchain network is transmitted, through the communication circuit to the server, based on identifying that a block last stored in each of the nodes match.

According to an embodiment, wherein the transaction information is transmitted, through the communication circuit to the server, based on identifying that a number of the first nodes among the nodes is greater than a designated number.

According to an embodiment, when a task of adding a block requested by another electronic device is to be completed by the server before acting on the request to add the new block, the request to add the new block is rejected by the server.

According to an embodiment, when the request to add the new block is consecutively transmitted a designated number of times for a designated time, the request to add the new block is rejected by the server.

According to an embodiment, when a number of the first nodes is greater than a designated number, an agreement condition for adding the new block to the nodes is met.

According to an embodiment, the designated number is determined to be smaller than a majority of the nodes included in the blockchain network.

According to an embodiment, a method performed by an electronic device comprises transmitting a request, through a communication circuit (e.g., communication module 1190) included in an electronic device (e.g., electronic device 101) to a server (e.g., server 150) configured to relay message transmission between nodes (e.g., nodes 101, 102, and 103) included in a blockchain network (e.g., blockchain network 140), to add a new block to the nodes included in the blockchain network, when the request is not rejected by the server, transmitting, through the communication circuit to the server for transmission to the nodes via the server, transaction information to be stored in the new block, generating the new block including the transaction information, receiving, through the communication circuit from the server, information about blocks generated by first nodes in an active state among the nodes, based on identifying that a number of blocks identical to the new block among the blocks generated by the first nodes is greater than a designated number, transmitting, through the communication circuit to the server, information indicating agreement on adding the new block, based on the transmitting, to the server, of the information indicating the agreement, adding the new block to memory (e.g., storage device 115 or memory 1130) included in the electronic device.

According to an embodiment, the method further comprises accessing the server, through the communication circuit, to identify information about a block last stored in each of the nodes and a state of the nodes.

According to an embodiment, the method further comprises, based on identifying that the block last stored in each of the nodes differ from each other, transmitting, through the communication circuit to the server, a message requesting the block last stored in each of the nodes to match.

According to an embodiment, the method further comprises, based on identifying that a number of a block last stored in the electronic device is smaller than a number of a block last stored in another node among nodes different from the electronic device, receiving, through the communication circuit from the server, information about the block last stored in the other nodes, and updating the block last stored in the memory based on the received information.

According to an embodiment, wherein the request to add the new block to the nodes included in the blockchain network is transmitted, through the communication circuit to the server, based on identifying that the block last stored in each of the nodes match.

According to an embodiment, when a task of adding a block requested by another electronic device is to be completed by the server before acting on the request to add the new block, the request to add the new block is rejected by the server.

According to an embodiment, when the requested to add the new block is consecutively transmitted a designated number of times for a designated time, the request to add the new block is rejected by the server.

According to an embodiment, when a number of the first nodes is greater than a designated number, an agreement condition for adding the new block to the nodes is met.

According to an embodiment, the designated number is determined to be smaller than a majority of the nodes included in the blockchain network.

According to an embodiment, one or more non-transitory computer-readable storage media (e.g., storage device 115 or memory 1130) storing one or more computer programs including computer-executable instructions that, when executed by one or more processors of an electronic device (e.g., electronic device 101), cause the electronic device to perform operations, the operations comprising transmitting a request, through a communication circuit (e.g., communication module 1190) included in the electronic device to a server (e.g., server 150) configured to relay message transmission between nodes (e.g., nodes 101, 102, and 103) included in a blockchain network, to add a new block to the nodes included in the blockchain network, when the request is not rejected by the server, transmitting, through the communication circuit to the server for transmission to the nodes via the server, transaction information to be stored in the new block, generating the new block including the transaction information, receiving, through the communication circuit from the server, information about blocks generated by first nodes in an active state among the nodes, based on identifying that a number of blocks identical to the new block among the blocks generated by the first nodes is greater than a designated number, transmitting, through the communication circuit to the server, information indicating agreement on adding the new block, and based on the transmitting, to the server, of the information indicating the agreement, adding the new block to memory (e.g., storage device 115 or memory 1130) included in the electronic device.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device for implementing a node for use as one of a plurality of nodes included in a blockchain network that includes other nodes different from the node, the electronic device for implementing the node comprising:

a communication circuit;

memory storing one or more computer programs; and one or more processors communicatively coupled to the communication circuit and the memory, wherein the one or more computer programs include computer-executable instructions that, when executed by the one or more processors individually or collectively, cause the electronic device for implementing the node to:

prior to transmitting a request to add a new block to the plurality of nodes included in the blockchain network, access a server, through the communication circuit, to obtain information about a block last stored in each of the other nodes, the server being configured to store and update respective information about a block last stored in each of the plurality of nodes, and relay transmission between the plurality of nodes, and identify, based on the obtained information about the block last stored in each of the other nodes, whether a block last stored in the electronic device for implementing the node and the block last stored in each of the other nodes match, based on identifying that the block last stored in the electronic device for implementing the node and the block last stored in each of the other nodes match, transmit the request, through the communication circuit to the server, to add the new block to the plurality of nodes, based on the request being not rejected by the server, transmit, through the communication circuit to the server for relay transmission to the other nodes via the server, transaction information to be stored in the new block, generate the new block including the transaction information, receive, through the communication circuit from the server, information about blocks generated by first nodes in an active state among the other nodes, based on identifying that a number of blocks identical to the new block among the blocks generated by the first nodes is greater than a designated number, transmit, through the communication circuit to the server, information indicating agreement on adding the new block, and based on the transmitting, to the server, of the information indicating the agreement, add the new block to the memory.

2. The electronic device for implementing the node of claim 1, wherein the one or more computer programs further include computer-executable instructions that, when executed by the one or more processors individually or collectively, cause the electronic device for implementing the node to:

access the server, through the communication circuit, to identify information about a state of each of the other nodes.

3. The electronic device for implementing the node of claim 1, wherein the one or more computer programs further include computer-executable instructions that, when executed by the one or more processors individually or collectively, cause the electronic device for implementing the node to:

based on identifying that the block last stored in the electronic device for implementing the node and the block last stored in each of the other nodes do not match, transmit, through the communication circuit to the server, a request for synchronization of the block last stored in the electronic device for implementing the node and the block last stored in each of the other nodes so as to have the block last stored in the electronic device for implementing the node and the block last stored in each of the other nodes match.

4. The electronic device for implementing the node of claim 3, wherein the one or more computer programs further include computer-executable instructions that, when executed by the one or more processors individually or collectively, cause the electronic device for implementing the node to:

based on identifying that a number of a block last stored in the electronic device for implementing the node is smaller than a number of a block last stored in another node in the active state among the other nodes, receive, through the communication circuit from the server, information about the block last stored in the another node; and update, in the memory, the block last stored in the electronic device for implementing the node based on the received information.

5. The electronic device for implementing the node of claim 1, wherein the transaction information is transmitted, through the communication circuit to the server, based on identifying that a number of the first nodes is greater than a designated number.

6. The electronic device for implementing the node of claim 1, wherein, when a task of adding a block requested by another node among the other nodes is to be completed by the server before acting on the request to add the new block, the request to add the new block is rejected by the server.

7. The electronic device for implementing the node of claim 1, wherein, when the request to add the new block is consecutively transmitted a designated number of times for a designated time, the request to add the new block is rejected by the server.

8. The electronic device for implementing the node of claim 1, wherein, when a number of the first nodes is greater than a designated number, an agreement condition for adding the new block to the plurality of nodes is met.

9. The electronic device for implementing the node of claim 8, wherein the designated number is determined to be smaller than a majority of the plurality of nodes.

10. A method performed by an electronic device for implementing a node for use as one of a plurality of nodes included in a blockchain network that includes other nodes different from the node, the method comprising:

prior to transmitting a request to add a new block to the plurality of nodes included in the blockchain network, accessing a server, through a communication circuit included in the electronic device for implementing the node, to obtain information about a block last stored in each of the other nodes, the server being configured to store and update respective information about a block last stored in each of the plurality of nodes, and relay transmission between the plurality of nodes, and identifying, based on the obtained information about the block last stored in each of the other nodes, whether a block last stored in the electronic device for implementing the node and the block last stored in each of the other nodes match;

based on identifying that the block last stored in the electronic device for implementing the node and the block last stored in each of the other nodes match, transmitting the request, through the communication circuit to the server, to add the new block to the plurality of nodes;

based on the request being not rejected by the server, transmitting, through the communication circuit to the server for relay transmission to the other nodes via the server, transaction information to be stored in the new block;

generating the new block including the transaction information;

receiving, through the communication circuit from the server, information about blocks generated by first nodes in an active state among the other nodes;

based on identifying that a number of blocks identical to the new block among the blocks generated by the first nodes is greater than a designated number, transmitting, through the communication circuit to the server, information indicating agreement on adding the new block; and based on the transmitting to the server, of the information indicating the agreement, adding the new block to memory included in the electronic device for implementing the node.

11. The method of claim 10, further comprising:

accessing the server, through the communication circuit, to identify information about a state of each of the other nodes.

12. The method of claim 10, further comprising:

based on identifying that the block last stored in the electronic device for implementing the node and the block last stored in each of the other nodes do not match, transmitting, through the communication circuit to the server, a request for synchronization of the block last stored in the electronic device for implementing the node and the block last stored in each of the other nodes so as to have the block last stored in the electronic device for implementing the node and the block last stored in each of the other nodes match.

13. The method of claim 12, further comprising:

based on identifying that a number of a block last stored in the electronic device for implementing the node is smaller than a number of a block last stored in another node among the other nodes, receiving, through the communication circuit from the server, information about the block last stored in the another node; and updating, in the memory, the block last stored in the electronic device for implementing the node based on the received information.

14. The method of claim 10, wherein, when a task of adding a block requested by another node among the other nodes is to be completed by the server before acting on the request to add the new block, the request to add the new block is rejected by the server.

15. The method of claim 10, wherein, when the request to add the new block is consecutively transmitted a designated number of times for a designated time, the request to add the new block is rejected by the server.

16. The method of claim 10, wherein, when a number of the first nodes is greater than a designated number, an agreement condition for adding the new block to the plurality of nodes is met.

17. The method of claim 16, wherein the designated number is determined to be smaller than a majority of the plurality of nodes.

18. One or more non-transitory computer-readable storage media storing one or more computer programs including computer-executable instructions that, when executed individually or collectively by one or more processors individually or collectively of an electronic device for implementing a node for use as one of a plurality of nodes included in a blockchain network that includes other nodes different from the node, cause the electronic device for implementing the node to perform operations, the operations comprising:

prior to transmitting a request to add a new block to the plurality of nodes included in the blockchain network, accessing a server, through a communication circuit included in the electronic device for implementing the node, to obtain information about a block last stored in each of the other nodes, the server being configured to store and update respective information about a block last stored in each of the plurality of nodes, and relay transmission between the plurality of nodes, and identifying, based on the obtained information about the block last stored in each of the other nodes, whether a block last stored in the electronic device for implementing the node and the block last stored in each of the other nodes match;

based on identifying that the block last stored in the electronic device for implementing the node and the block last stored in each of the other nodes match, transmitting the request, through the communication circuit to the server, to add the new block to the plurality of nodes;

based on the request being not rejected by the server, transmitting, through the communication circuit to the server for relay transmission to the other nodes via the server, transaction information to be stored in the new block;

generating the new block including the transaction information;

receiving, through the communication circuit from the server, information about blocks generated by first nodes in an active state among the other nodes;

based on identifying that a number of blocks identical to the new block among the blocks generated by the first nodes is greater than a designated number, transmitting, through the communication circuit to the server, information indicating agreement on adding the new block; and based on the transmitting, to the server, of the information indicating the agreement, adding the new block to memory included in the electronic device for implementing the node.

\* \* \* \* \*